US012809318B2

(12) United States Patent
Bonke

(10) Patent No.: US 12,809,318 B2
(45) Date of Patent: Nov. 24, 2026

(54) TIMEPIECE WITH AN OPTICAL BASED OSCILLATION SYSTEM

(71) Applicant: REALIZATION DESAL AG, Oberwil bei Zug (CH)

(72) Inventor: Michael Bonke, Oberwil bei Zug (CH)

(73) Assignee: Realization Desal AG, Oberwil bei Zug (CH)

( * ) Notice: Subject to any disclaimer, the term of this patent is extended or adjusted under 35 U.S.C. 154(b) by 285 days.

(21) Appl. No.: 18/573,101

(22) PCT Filed: Jun. 1, 2022

(86) PCT No.: PCT/EP2022/064909
§ 371 (c)(1),
(2) Date: Dec. 21, 2023

(87) PCT Pub. No.: WO2022/268463
PCT Pub. Date: Dec. 29, 2022

(65) Prior Publication Data

US 2024/0295857 A1 Sep. 5, 2024

(30) Foreign Application Priority Data

Jun. 25, 2021 (DE) ......................... 102021116557.1

(51) Int. Cl.
*G04F 13/02* (2006.01)

(52) U.S. Cl.
CPC .................................... *G04F 13/02* (2013.01)

(58) Field of Classification Search
CPC .. G04G 5/02; G04F 13/02; G04F 7/12; G04D 7/12
See application file for complete search history.

(56) References Cited

U.S. PATENT DOCUMENTS 4,297,656 A 10/1981 Pan
4,902,963 A * 2/1990 Brust ...................... G04F 10/00 968/844

(Continued)

FOREIGN PATENT DOCUMENTS

JP 2017040533 A 2/2017

OTHER PUBLICATIONS

PCT/EP2022/064909, International Search Report dated Aug. 29, 2022, 5 pgs.

(Continued)

*Primary Examiner* — Sean Kayes
(74) *Attorney, Agent, or Firm* — LOZA & LOZA, LLP; David S. Sarisky

(57) ABSTRACT

The invention relates to a watch, in particular a wristwatch, comprising a timer arrangement with an oscillation system. The oscillation system comprises a light wave guide arrangement with a light wave guide, an electro-optical converter adapted to feed a clocked light signal to the light wave guide arrangement, and an opto-electrical converter receiving the light signal from the light wave guide, adapted to generate an electrical signal based on the received light signal. The timer arrangement further comprises an electronic usage signal generating device configured to generate a usage signal based on a frequency of the electrical signal. The watch further comprises a watch display device adapted to display the time based on the usage signal.

11 Claims, 13 Drawing Sheets

(56) References Cited

U.S. PATENT DOCUMENTS

| | | | | |
|---|---|---|---|---|
| 6,363,036 | B1 * | 3/2002 | Siepmann ................. | G04F 5/00<br>331/135 |
| 7,061,335 | B2 | 6/2006 | Maleki et al. | |
| 7,151,415 | B1 | 12/2006 | Zhou | |
| 2019/0187624 | A1 * | 6/2019 | Tombez ................. | G04C 10/00 |
| 2020/0019127 | A1 | 1/2020 | Klopfenstein | |

OTHER PUBLICATIONS

PCT/EP2022/064909, Written Opinion dated Aug. 29, 2022, 8 pgs.
DE102021116557.1 Office Action, Jun. 15, 2022, 8 pgs.

* cited by examiner

TIMEPIECE WITH AN OPTICAL BASED OSCILLATION SYSTEM

CROSS-REFERENCE TO RELATED APPLICATIONS

This application is a National Stage of International Application No. PCT/EP2022/064909, filed Jun. 1, 2022, which claims priority based on German Patent Application Nos. 102021116557.1, filed Jun. 25, 2021, the entire disclosures of which are incorporated herein by reference.

TECHNICAL FIELD

The invention relates to a watch, in particular a wristwatch.

BACKGROUND

Quartz watches and mechanical watches with self-winding or manual winding are known from the state of the art. Quartz watches are clocked by the frequency of an oscillation quartz. On the other hand, self-winding mechanical watches, also known as automatic watches, and manual winding mechanical watches are generally controlled by the oscillation of a balance wheel, which controls the so-called escapement.

SUMMARY

It is the object of the invention to provide a watch that is as precise as possible.

It is described in the following a watch, in particular a wristwatch, comprising a timer arrangement with an oscillation system. The timer arrangement comprises an electronic usage signal generating device configured to generate a usage signal. Further, the watch comprises a watch display device adapted to display the time, in particular the time of day, based on the usage signal.

Preferably, the oscillation system comprises a light wave guide arrangement, an electro-optical converter and an opto-electrical converter. The light wave guide arrangement comprises a light wave guide, in particular an optical fibre. The electro-optical converter, also referred to as an electrical-optical converter, is adapted to feed a clocked light signal (optical signal) to the light wave guide arrangement. The opto-electrical converter, also referred to as an optical-electrical converter or photo-electrical converter, is adapted to receive the light signal from the light wave guide arrangement and to generate an electrical signal based on the received light signal.

The electronic usage signal generating device is configured to generate the usage signal based on a frequency of the electrical signal. Thus, a watch is provided, whose clock generation is based on the propagation speed of light (light speed) in the light wave guide arrangement. The time difference between the entry of the light into the light wave guide arrangement and the exit of the light on the other side of the light wave guide arrangement depends only on the distance travelled by the light in the light wave guide arrangement and on the propagation speed of the light (light speed) in the light wave guide arrangement. If the length and physical properties of the light wave guide arrangement are known, a clock signal with a fixed frequency and fixed period duration can be generated in this manner. This means that the light wave guide arrangement is the frequency-determining element of the oscillation system.

In particular, the light wave guide is the frequency-determining element, because it comprises the greatest length in the light wave guide arrangement.

It is to be understood that the oscillation frequency of the oscillation system to be achieved also depends on a delay of the signal caused by the electro-optical converter and the opto-electrical converter and possibly other electrical/electronic components of the oscillation system. In addition to the duration of the light signal travelling through the light wave guide, the operating time of the electronics of the light wave guide arrangement must also be taken into account when calculating the frequency of the oscillation system. However, while the duration of the light traveling is directly proportional to the length of the light wave guide, the operating time of the electronic components in the light wave guide arrangement is always the same, regardless of how long or short the light wave guide between the electro-optical converter and the opto-electrical converter is. The operating time of the electronic components in the light wave guide arrangement, i.e. the time delay between the arrival of the light signal at the opto-electrical converter and the transmission of a new light signal by the electro-optical converter, can be measured very easily, by measuring the frequency of the light wave guide arrangement in the functioning state, knowing from this the total duration of an amplitude of the oscillation system and subtracting from this duration the theoretical (determined by calculation) duration of the light signal through the light wave guide (from the electro-optical converter to the opto-electrical converter.

A practical measurement of the duration of the light signal while travelling through the light wave guide can also be made in this way:

Two oscillation systems comprising the same electrical signal path with the same components but differing in the length of their light wave guide arrangement, in particular the light wave guide of their light wave guide arrangement, are measured with respect to their oscillation frequency. For example, the light wave guide in the first oscillation system can comprise a length of 10 meters, wherein the light wave guide in the second oscillation system can comprise a length of 20 meters. From the resulting data, it is then very easy to determine the duration of the optical path, in particular of the light wave guide arrangement, and the duration of the electrical path, because the electrical path has the same duration in both cases, while the optical path in one case must have twice the duration of the other case.

A clear determination of the duration of the electrical signal through the electrical path is then also the prerequisite for producing a suitable table to compensate for the frequency deviation during a temperature change.

It can therefore be advantageous to measure an assembled oscillation system to determine its oscillation frequency. This will be explained in more detail later.

The clock generation in the inventive watch is independent of influences such as a movement or a position (horizontal or vertical) of the watch. Thus, in particular, the light-controlled wristwatch is significantly more precise than a wristwatch with a mechanical oscillation device, which is slowed or accelerated by any movement of the wrist of the wearer of the watch, in which the degree of tension of the drive spring of the clockwork has an influence on the escapement and, above that, on the frequency of the interaction of balance wheel/escapement and whose position influences the oscillation behavior of the balance wheel.

Problems that occur with oscillation crystals, such as so-called ageing, i.e. an oscillation frequency deviation that occurs over time due to the penetration of foreign atoms into the oscillation crystals or other time-related circumstances, do not occur in the light-controlled watch. In addition, clock generation via a piezoelectrical oscillation crystal, as well as clock generation via a balance wheel, is also based on a mechanical oscillation, namely the piezoelectrically stimulated mechanical oscillation of the oscillation crystal. Such a mechanical oscillation is more susceptible to attenuation than the clocked light signal in the proposed watch. Thus, the light-controlled watch is more accurate than a watch in which the clock pulse is generated by the oscillation of a piezoelectrical oscillation crystal.

In addition, the light-controlled watch provides great flexibility in terms of selecting the oscillation frequency of the oscillation system based on the clocked light signal. This can be easily selected according to the respective requirements of the watch and/or design preferences of the owner or, in the case of a wristwatch, the wearer of the watch. For example, it is possible to form the light wave guide arrangement, in particular the light wave guide, in a simple manner such that the oscillation system comprises a specific oscillation frequency according to the customer's requirements. It is also possible to modulate an amplitude of the electrical signal and thus also an amplitude of the light signal, thus individualizing the watch.

It is to be understood that in order to supply the clocked light signal to the light wave guide arrangement, the electro-optical converter is configured to convert an electrical input signal into the light signal.

It is further to be understood that the electrical signal is preferably also clocked, because the light signal is clocked.

According to an advantageous design of the invention, the oscillation system can be formed as an oscillation circuit. This means, in particular, that the components of the oscillation system are arranged in a circuit, i.e. in an endless loop.

The clocked light signal can preferably be an analogue clocked light signal, in particular a sinusoidal light signal. However, the analogue light signal can also have a form other than sinusoidal. Corresponding to this, the electrical signal generated by the opto-electrical converter can preferably be an analogue electrical signal, in particular a sinusoidal electrical signal. However, the analogue electrical signal can also comprise a shape other than the sinusoidal shape corresponding to the light signal.

However, it is also possible that the clocked light signal is in particular a digital light signal. Correspondingly, the electrical signal generated by the opto-electrical converter can in particular be a digital electrical signal.

Preferably, the electro-optical converter comprises a semiconductor laser or a light-emitting diode.

In particular, the electro-optical converter can be configured to supply the clocked light signal directly into the light wave guide.

The light wave guide can preferably comprise a single-mode fibre. In contrast to multimode fibres, a single-mode fibre is not subject to transit time dispersion and modal dispersion. However, it is also possible for the light wave guide to comprise a multimode fibre. A multimode fibre has the advantage that the light can be more easily coupled into the light wave guide and decoupled from the light wave guide.

To provide the oscillation system, a desired frequency for the clocked light signal or the electrical signal can advantageously first be selected and then the oscillation system, in particular the light wave guide arrangement and the light wave guide with regard to its length(s), can be adapted in such a way that the corresponding desired frequency is achieved. After the oscillation system has been formed, it can be measured to determine the actual frequency of the clocked light signal and the electrical signal. If the actual frequency deviates from the desired frequency, the oscillation system can be modified accordingly until the desired frequency is reached. However, it is also possible that the oscillation system, in particular the light wave guide arrangement and light wave guide in terms of its length, is/are first formed as required. The adapted oscillation system can then be measured to determine the frequency of the clocked light signal and the electrical signal. Taking the determined frequency into account, the usage signal generating device can thus be configured to generate the usage signal based on the determined frequency. For example, in the case of a usage signal generating device comprising a pulse counter, a predetermined count value, with which an electrical signal counted by the pulse counter is compared, can be set based on the determined frequency of the electrical signal.

Preferably, the opto-electrical converter comprises a photodiode. The photodiode is configured to convert the clocked light signal into the electrical signal. In an advantageous manner, the electrical signal is a current signal.

Preferably, the oscillation system further comprises a driver configured to drive the electro-optical converter based on the electrical signal. When the electro-optical converter comprises a semiconductor laser, the driver can also be termed a semiconductor laser driver. Correspondingly, in the case of an electro-optical converter comprising a light-emitting diode, the driver can also be termed a light-emitting diode driver.

According to a first advantageous design of the invention, the oscillation system can comprise an optical signal path in the light wave guide arrangement, in particular in the light wave guide, from the electro-optical converter to the opto-electrical converter and an electrical signal path from the opto-electrical converter to the electro-optical converter. The electro-optical converter is controllable in an advantageous manner based on the electrical signal of the opto-electrical converter. This means, in particular, that the electrical signal of the opto-electrical converter triggers the electro-optical converter to supply the light signal to the light wave guide arrangement, in particular the light wave guide.

In particular, the oscillation system can be designed as an oscillation circuit with optical feedback. The optical feedback occurs in that the light signal (optical output signal) of the electro-optical converter can be coupled via the light wave guide arrangement, in particular the light wave guide, on an input of the opto-electrical converter. The opto-electrical converter, the electrical signal path from the opto-electrical converter to the electro-optical converter, and the electro-optical converter can, in particular, be termed a transceiver in this design of the inventive watch. The light signal of the electro-optical converter can be fed back on an input of the transceiver via the light wave guide arrangement, in particular the light wave guide.

Preferably, the watch, in particular the oscillation system, comprises an electrical amplifier for amplifying the electrical signal between the opto-electrical converter and the electro-optical converter.

The electrical amplifier can preferably be configured to convert the electrical signal. That is, a voltage signal present at the input of the electrical amplifier is converted into a current signal outputting at the output of the electrical amplifier or a current signal entering the input of the electrical amplifier is converted into a voltage signal present at the output of the electrical amplifier. The respective output signal of the electrical amplifier is thereby amplified in comparison to the respective input signal of the electrical amplifier.

The amplifier is advantageously arranged downstream (with regard to the direction of the signal) of the opto-electrical converter. That means., in particular, the input signal of the electrical amplifier corresponds to an output signal of the opto-electrical converter or is based on an output signal of the opto-electrical converter.

In particular, the electrical amplifier can be adapted to convert an input current into an output voltage. Particularly preferably, the amplifier is formed as a transimpedance amplifier. The transimpedance amplifier can convert an input current into a proportional output voltage in an advantageous manner. Regarding the design of the electrical amplifier, the opto-electrical converter is advantageously adapted to convert the received light signal into a current signal. In particular, the electrical amplifier is part of the electrical signal path from the opto-electrical converter to the electro-optical converter.

Preferably, the watch, in particular the oscillation system, comprises a trigger and a monoflop. The trigger is configured to control the monoflop via the electrical signal from the opto-electrical converter. The monoflop is preferably configured to generate an output pulse to drive the electro-optical converter. In particular, the output pulse is generated in response to the controlling of the monoflop by the trigger. Preferably, the monoflop is a digital circuit, which has only one stable state. Triggered by an incoming trigger signal from the trigger, the monoflop changes its switching state for a predefined time (approx. 1 ns or less). The monoflop then returns to its rest state. In particular, the trigger and the monoflop are part of the electrical signal path from the opto-electrical converter to the electro-optical converter. By providing the monoflop, a clocked electrical signal is generated in a simple manner, which is converted into the clocked light signal by the electro-optical converter.

The electrical signal path from the opto-electrical converter to the electro-optical converter is preferably configured to invert the electrical signal.

Preferably, the electrical signal path is configured to alternately switch the electro-optical converter on and off via the inverted electrical signal.

For this purpose, according to an advantageous embodiment, the electrical signal path can comprise a (separate) inverter (inverter circuit). The inverter is preferably adapted to alternately switch the electro-optical converter on and off. According to an alternative advantageous embodiment, an output of the electrical amplifier described above, in particular of the transimpedance amplifier described above, can be an inverting output. The electrical signal is inverted by the inverting output. According to a further alternative advantageous embodiment, an input of the driver described above can be an inverting input. In this case, the electrical signal is inverted by the inverting input of the driver. In the case of an inverting output of the electrical amplifier or an inverting input of the driver, preferably no separate inverter is provided in the electrical signal path.

The oscillation system preferably further comprises a frequency filter for filtering the electrical signal. The frequency filter is arranged between the opto-electrical converter and the electro-optical converter. In particular, the frequency filter can be used to force the system to oscillate on its oscillation frequency by filtering out undesirable higher harmonic wave from the electrical signal. However, it is also possible to specifically select a higher harmonic wave with the frequency filter.

In an advantageous design of the invention, the frequency filter is disposed between the electrical amplifier and the driver.

The watch, in particular the timer arrangement, preferably further comprises a Schmitt trigger, which is configured to convert the electrical signal into a square wave signal (output signal of the Schmitt trigger). A Schmitt trigger is an analogue-to-digital converter. Regarding the design of the watch, this means that the electrical signal, which serves as the input signal of the Schmitt trigger, is an analogue electrical signal, wherein the square-wave signal is a digital electrical signal. In particular, during operation of the watch, an analogue voltage (analogue voltage signal) is present at the input of the Schmitt trigger, wherein a digital voltage (digital voltage signal) is present at its output.

Furthermore, the Schmitt trigger is connected to the usage signal generating device in an advantageous manner. This means that the output signal of the Schmitt trigger, namely the square wave signal, serves as the input signal for the usage signal generating device.

Alternatively, another analogue-to-digital converter can be used instead of a Schmitt trigger. However, it is also possible not to provide an analogue-to-digital converter.

It should be noted that the electrical signal in the electrical signal path can be a current signal or a voltage signal. The electrical signal can be converted from one type (current signal/voltage signal) to the other type (voltage signal/current signal) in the electrical signal path.

According to a second advantageous design of the invention, the light wave guide arrangement is formed as an endless loop. Thereby, the timer arrangement comprises an optical splitter for decoupling the light signal from the endless loop into the opto-electrical converter and an optical coupler for coupling the light signal from the electro-optical converter into the endless loop. The term “endless loop” means, in particular, that the light wave guide arrangement is formed as a closed optical loop, in which a light signal generated once and introduced into the light wave guide arrangement, is guided in a loop for an unlimited period of time. In the endless loop, preferably an output of the light wave guide is fed back to its input. Thus, a light signal fed in via the optical coupler to start operation of the clock generation can propagate endlessly in the endless loop, wherein the extraction of the clocked light signal thereby takes place via an optical splitter.

It should be noted that an optical splitter in the context of the invention is in particular a device configured to split an incoming light signal into two or multiple light signals. On the other hand, in the context of the invention, an optical coupler is in particular a device configured to couple one or more light signals into a light wave guide.

Preferably, the watch can comprise an optical amplifier in the light wave guide arrangement formed as an endless loop. That is, the light wave guide arrangement comprises the light wave guide and an optical amplifier. The optical amplifier is advantageously configured to amplify the incoming light signal as it passes through, without having converted it into an electrical signal in between.

In particular, the way of connecting the light wave guide, the optical amplifier, the electro-optical converter and the opto-electrical converter to each other can be as follows. An output of the light wave guide is connected to a first input of the optical coupler. An output of the optical coupler is connected to an input of the optical amplifier. An output of the optical amplifier is connected to an input of the optical splitter, the first output of which is connected to an input of the light wave guide. An output (optical output) of the electro-optical converter is connected to a second input of the optical coupler. A second output of the optical splitter is connected to an input (optical input) of the opto-electrical converter. The electrical signal (output signal of the opto-electrical converter) is then available at an output of the opto-electrical converter. From this electrical signal, preferably the usage signal can be generated via the usage signal generating device.

Preferably, the electro-optical converter can be controllable by an electrical signal from the opto-electrical converter. This creates an electrical signal path between the opto-electrical converter and the electro-optical converter.

Particularly preferably, the watch can comprise an electrical amplifier. The electrical amplifier is arranged to amplify the electrical signal between the opto-electrical converter and the electro-optical converter. This means, in particular, that the electrical amplifier is disposed in the electrical signal path between the opto-electrical converter and the electro-optical converter.

Preferably, the light wave guide arrangement is subdivided into a first section between the optical coupler and the optical splitter and a second section between the optical splitter and the optical coupler. Here, a delay of the light signal in the second section corresponds to a delay of a parallel signal from the optical splitter to the optical coupler.

According to a first advantageous embodiment, the second section can comprise a delay line or a further light wave guide. The further light wave guide can also be termed as a second light wave guide, wherein the light wave guide in the first section between the optical coupler and the optical splitter can be termed as a first light wave guide. In this case, the opto-electrical converter and the electro-optical converter are arranged between the optical splitter and the optical coupler and connected to each other. Thus, a delay of the light signal in the delay line or the further light wave guide corresponds to a delay of the parallel signal from the optical splitter via the opto-electrical converter and the electro-optical converter to the optical coupler. An electrical amplifier can preferably be arranged between the opto-electrical converter and the electro-optical converter. Preferably, a single electrical signal can be supplied between the opto-electrical converter and the electrical amplifier EV. An electrical signal can preferably be picked up between the electrical amplifier and the electro-optical converter. From this electrical signal, preferably the usage signal can be generated via the usage signal generating device.

In particular, the way of connecting the components of the light wave guide arrangement to each other and with the electro-optical converter and the opto-electrical converter in the first advantageous embodiment described above can be as follows. A first output of the optical splitter is connected via the delay line or the second light wave guide with a first input of the optical coupler. An output of the optical coupler is connected to an input of the light wave guide. A second output of the optical splitter is connected to an input of the opto-electrical converter. An input of the electro-optical converter is connected to an output of the opto-electrical converter. A first input of the optical coupler is connected to an output of the delay line or the second light wave guide. A second input of the optical coupler is connected to an output of the electro-optical converter. When an electrical amplifier is arranged between the opto-electrical converter and the electro-optical converter, an output of the opto-electrical converter is connected to an input of the electrical amplifier and an output of the electrical amplifier is connected to an input of the electro-optical converter.

According to a second advantageous embodiment, the optical splitter is a first optical splitter and the optical coupler is a first optical coupler. Thereby, the second section comprises a delay line, a second optical coupler and a second optical splitter. Furthermore, an optical amplifier for amplifying the light signal between the first optical splitter and the second optical splitter is preferably arranged between the first optical splitter and the first optical coupler. Thus, a delay of the light signal from the first optical splitter via the second optical coupler, the delay line and the second optical splitter to the first optical coupler corresponds to a delay of a parallel signal from the first optical splitter via the optical amplifier to the first optical coupler.

In particular, the way of connecting the components of the light wave guide arrangement to each other and with the electro-optical converter and the opto-electrical converter in the alternative advantageous embodiment described above can be as follows. A first output of the first optical splitter is connected to an input of the optical amplifier. An output of the optical amplifier is connected to a first input of the first optical coupler. An output of the first optical coupler is connected to an input of the light wave guide. A second output of the first optical splitter is connected to a first input of the second optical coupler. Its output is connected to an input of the delay line. An output of the delay line is connected to an input of the second optical splitter. A first output of the second optical splitter is connected to a second input of the first optical coupler. An output (optical output) of the electro-optical converter is connected to a second input of the second optical coupler. A second output of the second optical splitter is connected to an input of the opto-electrical converter. The electrical signal (output signal of the opto-electrical converter) is available at an output of the opto-electrical converter. The usage signal can be generated preferably from this electrical signal via the usage signal generating device. Due to the two parallel optical signal paths (first signal path: first optical splitter-second optical coupler-delay line-second optical splitter-first optical coupler; second signal path: first optical splitter-optical amplifier-first optical coupler), it is possible to maintain a continuous signal flow in the light wave guide arrangement formed as an endless loop via the light wave guide, even when the optical amplifier is deactivated for a short time. This makes it possible to activate the optical amplifier, only when the optical signal power drops below a definable minimum value due to the attenuation in the endless loop. By cyclically switching the optical amplifier on and off, the power consumption of the clock generation can be optimized as required.

Preferably, the watch comprises a data unity. Preferably, the data unit comprises a modulator for modulating the input signal of the electro-optical converter based on a data set.

The data set can advantageously comprise a personal resolution, such as a resolution to quit smoking, or a name of a loved one, a personal target or ideal, but also a religious message such as a mantra. The data set can be encoded in terms of light and travel at the speed of light in the oscillation system. Coding is possible, for example, by modulating the amplitude of the electrical signal. If the amplifier is set appropriately, this has no influence on the oscillation frequency of the oscillation system being set and the frequency of the electrical signal. The accuracy of the time base is not affected by this. This different amplitude can be indicated, for example, by a light-emitting diode, which then lights up with different brightness. For example, a Morse code alphabet with signal pulses of different lengths can be used as coding.

Particularly preferably, the watch can comprise a memory unit for storing the data set and/or an input unit for inputting the data set and/or a readout unit for reading out the data set from the modulated output signal of the opto-electrical converter. Further preferably, the watch can comprise an output unit for outputting information based on the read-out data set. The information can comprise, for example, a light and/or a sound and/or an electrical data signal, which can preferably be output via WLAN or Bluetooth.

Preferably, the watch comprises a crystal oscillator with a predetermined crystal oscillator oscillation frequency. The usage signal generating device is adapted to compare the frequency of the electrical signal with the crystal oscillator oscillation frequency to generate an actual comparison value. Furthermore, the usage signal generating device is adapted to generate the usage signal based on the frequency of the electrical signal and the actual comparison value. Thus, the usage signal can be generated taking into account a difference between the frequency of the electrical signal and the crystal oscillator oscillation frequency, which serves as the reference frequency. The difference between the frequency of the electrical signal and the crystal oscillator oscillation frequency is represented by the actual comparison value. This allows a deviation of the frequency of the electrical signal from an expected frequency of the electrical signal to be taken into account when generating the usage signal. Such a deviation can be set, for example, by a temperature deviation from a predetermined temperature, on which the oscillation system is set. Such a temperature deviation can have an influence on the light wave guide arrangement, in particular the light wave guide, because a light wave guide in particular expands as a function of temperature.

Particularly preferably, multiple temperature-dependent memory comparison values and associated correction values are stored in the usage signal generating device. The usage signal generating device is further adapted to assign the actual comparison value to a memory comparison value and to generate the usage signal based on the frequency of the electrical signal and the correction value.

To generate the above-mentioned usage signal, the electronic usage signal generating device can advantageously comprise (only) a pulse counter (binary counter). In this case, the pulse counter is configured to count a clock signal of the oscillation system, i.e. the electrical signal. The pulse counter is programmed on the frequency of the electrical signal.

Furthermore, for generating the above-mentioned usage signal, the electronic usage signal generating device can advantageously comprise (only) a frequency divider. The frequency divider is configured to divide, in particular to halve, the frequency of the clock signal, i.e. the electrical signal. In particular, the frequency of the electrical signal can correspond to a multiple of two, in particular a power of two, such as 524288 Hz or 1048576 Hz. The frequency of the electrical signal can be advantageously broken down to 1 Hz or another frequency, such as 8 Hz, via the frequency divider. The broken-down frequency corresponds to the usage signal, based on which the watch display device is configured to display the time. It should be noted that with a usage signal with a frequency of, for example, 8 Hz, the jump of a second pointer of a mechanical watch display device, which then occurs 8 times per second, is not perceived as a "jump" by the viewer.

The term "only" in use with the terms of pulse counter or frequency divider means in particular in the context of the invention that only one of the two types of electronic components, i.e. either only a pulse counter or only a frequency divider, is provided to generate the usage signal generating device in order to generate the usage signal.

However, a combination of a frequency divider with a pulse counter is also possible to generate the usage signal. In other words, this means that the timer arrangement for generating the usage signal can comprise both a frequency divider and a pulse counter. In this case, the frequency divider is advantageously arranged upstream (with regard to the direction of the signal) of the pulse counter. In an advantageous manner, the frequency of the electrical signal can be halved, in particular halved several times, by the frequency divider in a first step to achieve an intermediate frequency. In a second step, the intermediate frequency can be brought via the pulse counter on a desired frequency, in particular usage frequency. The procedure of halving, in particular halving several times, the predetermined oscillation frequency in a first step to achieve an intermediate frequency and counting down the intermediate frequency to a desired frequency in a second step is particularly advantageous for a watch in which the electrical signal comprises a high frequency, such as 8.88 MHz or 10 MHz. Thus, current can be saved compared with simply counting down the frequency of the electrical signal.

In the case of an electronic usage signal generating device comprising only a pulse counter, the usage signal generating device is advantageously configured to generate the usage signal, when a count value of the electrical current signal is equal with a predetermined count value. The predetermined count value is advantageously set based on the frequency of the electrical signal.

In the case of an electronic usage signal generating device comprising only a frequency divider, the usage signal advantageously corresponds to the output signal of the frequency divider.

In the case of an electronic usage signal generating device comprising a pulse counter and a frequency divider, the electronic usage signal generating device is advantageously configured to generate the usage signal when a count value of an output signal of the frequency divider is equal with a predetermined count value. In this case, the predetermined count value is advantageously set based on the intermediate frequency achieved by the frequency divider.

Furthermore, the timer arrangement can preferably comprise an output device. The electronic output device is configured to output the usage signal generated by the usage signal generating device.

It should be noted that the pulse counter and the output device or the frequency divider and the output device can respectively be formed as a single unity.

During a deviation of a temperature of the oscillation system and/or a temperature of the watch, in particular in the surroundings of the oscillation system, from a predetermined temperature, which is greater than a predetermined deviation, the electronic usage signal generating device can advantageously be configured to take into account a corresponding predetermined correction factor or a predetermined correction formula in order to generate the usage signal. A corresponding predetermined correction factor is advantageously assigned to a respective temperature deviation.

In particular, when the electronic usage signal generating device comprises a pulse counter as described above, in case of such a temperature deviation, the electronic usage signal generating device can advantageously be configured to correct the predetermined count value of the pulse counter via the predetermined correction factor or the predetermined correction formula.

It is also possible that the usage signal generating device is configured to correct the predetermined count value in dependency of a temperature of the oscillation system and/or a temperature of the watch, in particular in the surroundings of the oscillation system. For this purpose, a table with temperature-dependent predetermined count values (predetermined count values that are assigned to temperatures) and/or a function of the predetermined count value in dependency of the temperature can preferably be stored in a memory unit, in particular of the usage signal generating device.

For detecting the temperature of the oscillation system and/or the watch in the surroundings of the oscillation system and thus detecting a temperature deviation, the watch can preferably comprise a temperature sensor.

Irrespective of the structure of the oscillation system and/or the timer arrangement with regard to the presence of a pulse counter and/or a frequency divider, the watch can comprise the following advantageous designs.

According to an advantageous design of the watch, the timer arrangement comprises an electromechanical device. The watch further comprises a gear train, a drive device for driving the gear train and a watch display device. The watch display device is connected to the gear train and is movable by the gear train. The electromechanical device is movable via the usage signal generated by the electronic usage signal generating device, whereby the electromechanical device directly or indirectly engages with the gear train in a clocked manner. In particular, the electromechanical device engages directly or indirectly with the gear train in an inhibiting manner to bring the gear train alternately to a standstill and release it again. Thus, the watch is not clocked in its rate by an oscillating balance wheel, but via a frequency-controlled device (the electromechanical device), wherein the drive energy for the gear train is provided by a mechanical drive device. In other words, the inaccurate mechanical balance wheel is replaced by the timer arrangement described above.

Thus, the advantages of a manual winding or self-winding mechanical watch and a quartz watch are realized in a watch by controlling an automatic movement or a manual winding mechanical movement by the oscillation frequency of the light-driven oscillation system. Because no balance wheel is provided in the proposed watch, all mechanical influences that affect the clock of the balance wheel and thus the accuracy of the watch's time flow are eliminated. The reference frequency used to clock the watch, which is based on the frequency of the electrical signal, is not influenced by any movement of the wearer of the watch. Thus, a mechanical watch is enabled in terms of driving the gear train, which is much more precise than a conventional mechanical watch with a balance wheel.

Because the electromechanical device is movable via the usage signal generated by the electronic usage signal generating device, and the usage signal is generated based on the frequency of the electrical signal, it is to be understood that the electromechanical device is frequency-controllable and frequency-controlled.

According to an advantageous embodiment, the electromechanical device engages indirectly in the gear train. "Indirectly" in the context of the present invention means, in particular, that at least one further component is disposed between the electromechanical device and the gear train. That is, in this design of the watch, the electromechanical device is movable via the aforementioned usage signal, whereby the electromechanical device indirectly engages with the gear train for escapement.

Preferably, the watch comprises an escapement for this purpose. The escapement is in engagement with the gear train. The electromechanical device drives the escapement. This means that in this design of the watch, the electromechanical device is movable via the usage signal generated by the electronic usage signal generating device, whereby the electromechanical device engages with the gear train via the escapement. With other words, the escapement corresponds to the above-mentioned at least one further component, which is disposed between the electromechanical device and the gear train.

Preferably, the escapement comprises an escapement wheel and an escapement piece. The escapement piece is configured to inhibit the escapement wheel. Thereby, the electromechanical device is arranged to drive the escapement wheel, wherein the escapement wheel is in engagement with the gear train.

In particular, the escapement is formed as an anchor escapement, wherein the escapement wheel is formed as an anchor. In this case, the escapement wheel can also be referred to as an escape wheel.

According to an alternative advantageous embodiment of the invention, the electromechanical device can engage directly with the gear train. "Directly" in the context of the present invention means, in particular, that no other component is disposed between the electromechanical device and the gear train. This means that in this design of the watch, the electromechanical device is movable via the above-mentioned usage signal, whereby the electromechanical device engages directly with the gear train in a clocked manner.

Irrespective of whether the electromechanical device engages directly or indirectly in the gear train, the electromechanical device can be formed as an actuator according to an advantageous embodiment of the invention. In the context of the present invention, an actuator is in particular a drive device or structural unit that converts an electrical signal into a mechanical movement.

Particularly preferably, the actuator may comprise a magnetic anchor and a magnetic coil. In this case, the magnetic coil is configured to move the magnetic anchor via the usage signal.

Alternatively, the electromechanical device can preferably be formed as a stepper motor. Regarding this design of the electromechanical device, it is particularly advantageous, when the electromechanical device engages directly in a clocked manner in the gear train.

According to an alternative advantageous design of the watch, the watch further comprises a gear train, a drive device for driving the gear train and a watch display device. The watch display device is connected to the gear train and is movable by the gear train. The drive device can be controlled via the usage signal. The drive device is preferably formed as a stepper motor. This watch corresponds in particular to a conventional quartz watch with a stepper motor for driving a mechanical watch display device, in which a timer arrangement with a timer formed as a quartz oscillation crystal has been replaced by the previously described timer arrangement with the light-driven oscillation system.

It is to be understood that in the two advantageous designs of the invention described above, the above-mentioned watch display device is a mechanical watch display device. Preferably, the watch display device comprises an hour pointer and/or a minute pointer and/or a second pointer.

The gear train preferably comprises at least an hour wheel and/or a minute wheel and/or a second wheel and/or a third wheel.

According to an alternative advantageous design of the watch, the watch further comprises an electronic watch display device. This watch corresponds in particular to a conventional electronic quartz watch, in which the timer arrangement with the timer formed as a quartz oscillation crystal has been replaced by the previously described timer arrangement with the light-driven oscillation system.

BRIEF DESCRIPTION OF THE DRAWINGS

Further details, advantages and features of the present invention will become apparent from the following description of embodiments with reference to the drawing. It shows in.

DETAILED DESCRIPTION

In the following, a watch 100 according to a first embodiment of the present invention is described in detail with reference to FIGS. 1 to 4.

Figure 1:
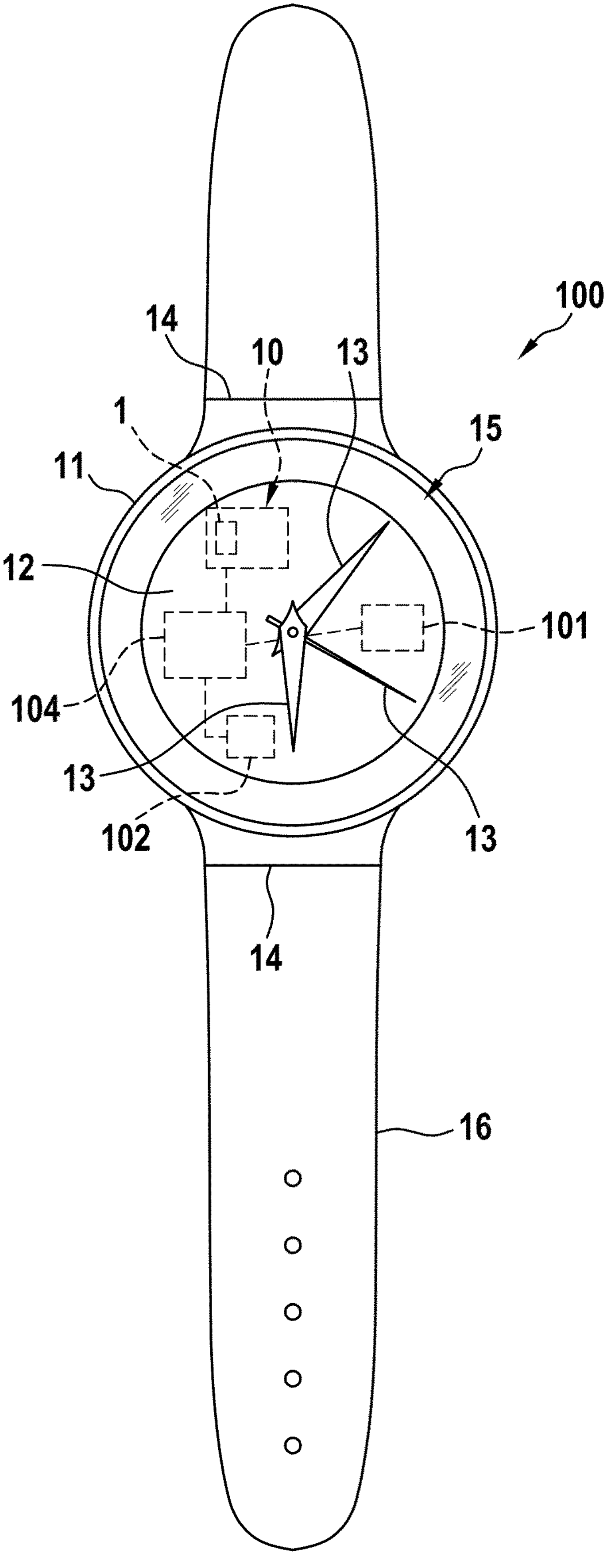
FIG. 1 a simplified, schematic view of a watch according to a first embodiment of the present invention, FIG. 2 a simplified, schematic view of a portion of the watch according to the first embodiment of the invention, FIG. 3 a simplified, schematic view of a portion of the watch according to the first embodiment of the invention, FIG. 4 a simplified, schematic view of a portion of the watch according to the first embodiment of the invention, FIG. 5 a simplified, schematic view of a portion of the watch according to a second embodiment of the invention, FIG. 6 a simplified, schematic view of a portion of the watch according to the second embodiment of the invention, FIG. 7 a simplified, schematic view of a portion of the watch according to a third embodiment of the invention, FIG. 8 a simplified, schematic view of a portion of the watch according to a fourth embodiment of the invention, FIG. 9 a simplified, schematic view of a portion of the watch according to a fifth embodiment of the invention, FIG. 10 a simplified, schematic view of a portion of the watch according to a sixth embodiment of the invention, FIG. 11 a simplified, schematic view of a portion of the watch according to a seventh embodiment of the invention, FIG. 12 exemplary time characteristics of an input signal, an output signal and a clock signal for explaining the operating principle of the watch according to the seventh embodiment of the invention, FIG. 13 a simplified, schematic view of a portion of the watch according to an eighth embodiment of the invention, FIG. 14 a simplified, schematic view of a portion of the watch according to a ninth embodiment of the invention, FIG. 15 a simplified, schematic view of a portion of the watch according to a tenth embodiment of the invention, and FIG. 16 a simplified, schematic view of a portion of the watch according to an eleventh embodiment of the invention.

As can be seen from FIG. 1, the watch 100 is formed as a wristwatch and thus comprises two ports 14 for a wristband 16. However, it is also possible that the watch 100 is a wall clock, a grandfather clock, a table clock or a watch of another type.

The watch 100 comprises a watch case 11 and a watch glass 15 arranged thereon. The watch 100 further comprises a dial 12 and three pointers 13 for indicating the hours, minutes and seconds. The pointers 13 are parts of a mechanical watch display device 102 for displaying the time.

Furthermore, the watch 100 comprises a timer arrangement 10, a gear train 104 and a drive device 101 for driving the gear train 104. The gear train 104 is connected to the watch display device 102, so that the pointers 13 of the watch display device 102 are movable. In particular, the gear train 104 comprises at least an hour wheel, a minute wheel and a second wheel, which are respectively connected to one of the pointers 13.

Figure 2:
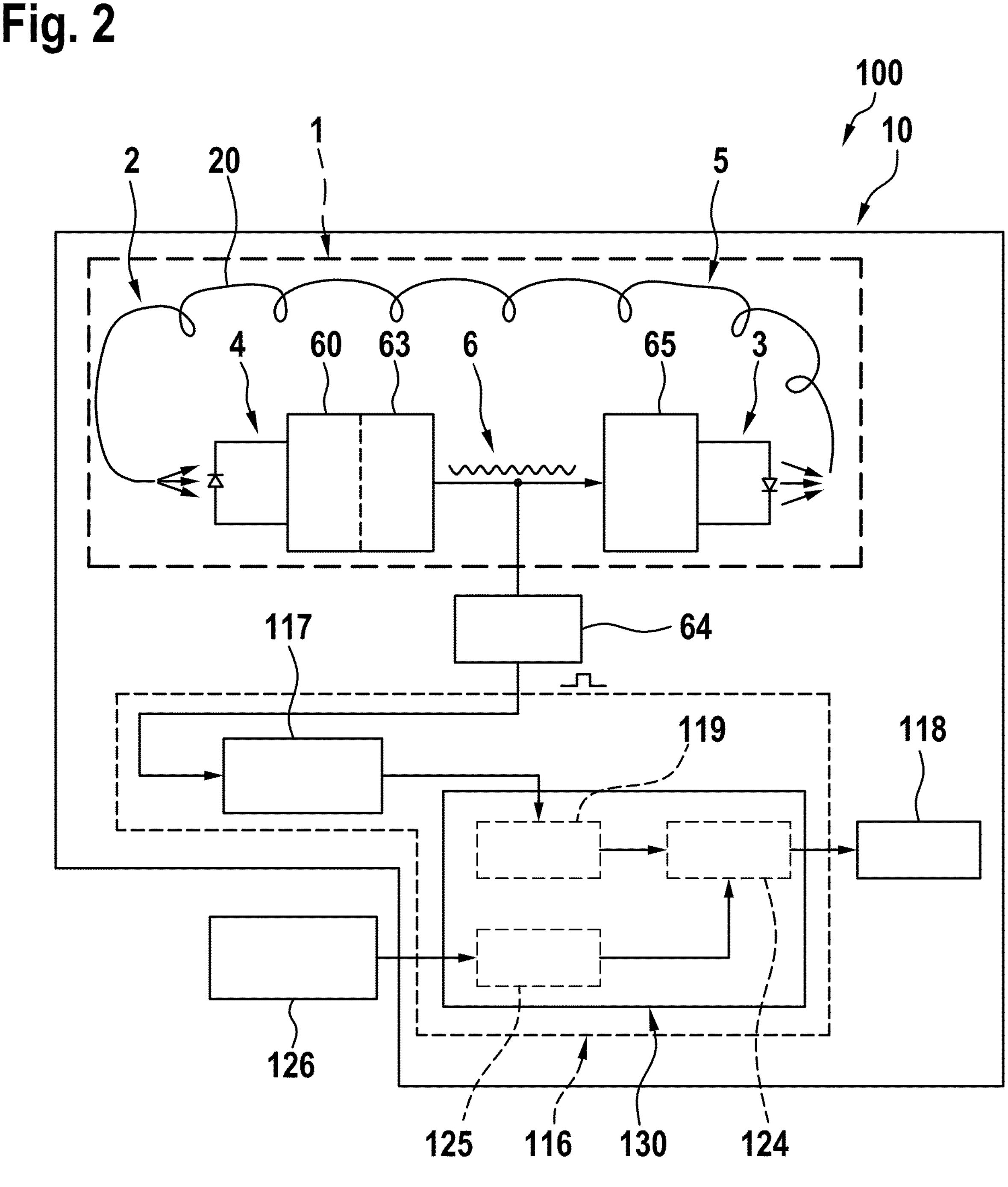

FIG. 2 shows that the timer arrangement 10 comprises an oscillation system 1 and an electronic usage signal generating device 116.

The usage signal generating device 116 is configured to generate a usage signal. The usage signal can be used by the watch display device 102 to display the time based thereon.

The oscillation system 1 comprises a light wave guide arrangement 2 with a light wave guide 20, an electro-optical converter 3 and an opto-electrical converter 4. Furthermore, the oscillation system 1 comprises an electrical amplifier 60, a frequency filter 63 and a driver 65. The frequency filter 63 is disposed between the electrical amplifier 60 and the driver 65.

The electro-optical converter 3, which comprises a semiconductor laser or a light-emitting diode, is adapted to feed a clocked light signal to the light wave guide arrangement 1, in particular directly to the light wave guide 20. The clocked light signal is advantageously an analogue clocked light signal, in particular a sinusoidal light signal.

The light wave guide 20 can preferably comprise a single mode fibre. In contrast to multimode fibres, a single-mode fibre is not subject to transit time and mode dispersion. However, it is also possible that the light wave guide comprises a multimode fibre. A multimode fibre has the advantage that light can be more easily coupled into the light wave guide 20 and decoupled from the light wave guide 20.

The light wave guide 20 can be 20 meters long, for example. With such a length, the transit time of the light signal is therefore approximately 100 ns. This corresponds to an oscillation frequency of 10 MHz for the oscillation system 1. However, other frequencies can also be selected for the oscillation system 1, such as 8.88 MHz. In this case, the light wave guide 20 would have to be selected to be correspondingly longer for the oscillation frequency of 8.88 MHz.

The opto-electrical converter 4 is adapted to receive the light signal from the light wave guide arrangement 2 and the light wave guide 20 and to generate an electrical signal based on the received light signal. In particular, the opto-electrical converter 4 comprises a photodiode. The photodiode is configured to convert the clocked light signal into a current signal. Analogue to the light signal, the current signal is an analogue current signal, in particular a sinusoidal current signal.

The electrical amplifier 60, which is formed as a transimpedance amplifier, is configured to amplify the current signal generated by the opto-electrical converter 4 and to convert it into a proportional voltage signal.

The frequency filter 63 is configured to filter the voltage signal. With the frequency filter 63, it is possible in particular to force the oscillation system to oscillate on its oscillation frequency, in particular by filtering out undesirable harmonic wave from the voltage signal.

The driver 65 is configured to control the electro-optical converter 3 based on the filtered voltage signal. Thus, the electro-optical converter 3 is controllable based on the converted and filtered electrical signal of the opto-electrical converter 4.

In particular, a modulation input of the driver 65 is non-inverting. This means that an increase in the input voltage results in an increase in the light output. However, the modulation input of the driver 65 can also be inverting. In this case, the oscillation frequency of 10 MHz can already be achieved with a length of 10 m for the light wave guide 20.

An electrical signal path 6 from the opto-electrical converter 4 to the electro-optical converter 3 is formed by the described arrangement of the electrical amplifier 60, the frequency filter 63 and the driver 65. With other words, the electrical amplifier 60, the frequency filter 63 and the driver 65 are arranged in the electrical signal path 6.

Furthermore, an optical signal path 5 is formed in the light wave guide arrangement 2, in particular in the light wave guide 20, from the electro-optical converter 3 to the opto-electrical converter 4.

When looking at FIG. 2, it can be seen that the oscillation system 1 is designed as an oscillation circuit with optical feedback. The optical feedback is achieved by the fact that the light signal (optical output signal) of the electro-optical converter 3 can be coupled via the light wave guide arrangement 2, in particular the light wave guide 20, to an input of the opto-electrical converter 4.

The timer arrangement 10 further comprises a Schmitt trigger 64, which is an analogue-to-digital converter. The Schmitt trigger 64 is configured to convert the analogue voltage signal between the frequency filter 63 and the driver 65 into a square-wave signal (output signal of the Schmitt trigger 64). The square-wave signal is a digital voltage signal. Alternatively, another analogue-to-digital converter can be used instead of the Schmitt trigger 64.

The Schmitt trigger 64 is connected to the usage signal generating device 116. This means that the output signal of the Schmitt trigger 64, namely the square wave signal, serves as the input signal for the usage signal generating device 116. However, it is also possible that no analogue-to-digital converter is provided, so that the electrical signal between the frequency filter 63 and the driver 65 serves as the input signal for the electronic usage signal generating device 116.

The electronic usage signal generating device 116 is configured to generate the usage signal based on a frequency of the square wave signal corresponding to a frequency of the electrical signal between the frequency filter 63 and the driver 65.

According to FIG. 2, the usage signal generating device 116 comprises a frequency divider 117, a pulse counter 119 and a comparator 124 for generating the usage signal.

The frequency divider 117 is connected to the pulse counter 119. Here, the pulse counter 119 is arranged downstream of the frequency divider 117 signaling-technically. This means that an output signal of the frequency divider 117 serves as the input signal of the pulse counter 119. In a first step, the frequency of the square-wave signal can be halved, in particular halved several times, to reach an intermediate frequency by the frequency divider 117. In a second step, the intermediate frequency can be brought to a desired frequency and a usage frequency via the pulse counter 119. The usage frequency can be 1 Hz or 8 Hz, for example.

At the oscillation frequency of the oscillation system 1 of 10 MHz, the square wave signal described above can be halved seven times by the frequency divider 117, until the intermediate frequency of 78125 Hz is reached. The intermediate frequency can then be counted down to the usage frequency of 1 Hz or to 8 Hz with the pulse counter 119. Halving the oscillation frequency 7 times from 10 MHz first to 78125 Hz, with subsequent pulse counting, saves current compared with direct pulse counting from 10 MHz to 1 Hz or 8 Hz.

In particular, the usage signal generating device 116 is configured to generate the usage signal, when a count value of an output signal of the frequency divider 117 is equal with a predetermined count value. The predetermined count value is advantageously stored in the comparator 124 and is set based on the intermediate frequency achieved by the frequency divider 117. The comparison between the count value of the output signal of the frequency divider 117 with the predetermined count value is performed via the comparator 124.

The watch 100 further comprises a temperature sensor 126. Via the temperature sensor 126, a temperature of the oscillation system 1 and/or the watch 100, in particular in the surroundings of the oscillation system 1, can be detected.

During a deviation of the detected temperature from a predetermined temperature, which is greater than a predetermined deviation, the electronic usage signal generating device 116 is preferably configured for generating the usage signal to take a corresponding predetermined correction factor into account. Preferably, a corresponding predetermined correction factor is assigned to a respective temperature deviation. Alternatively, a predetermined correction formula can be used instead of correction factors. The correction factors or the correction formula are stored in a memory 125.

In particular, the electronic usage signal generating device 116 is configured to correct the predetermined count value via the corresponding predetermined correction factor or the predetermined correction formula.

It should be noted that the pulse counter 119, the comparator 124 and the memory 125 are preferably parts of a programmable microcontroller 130.

The timer arrangement 10 further comprises an output device 118 connected to the usage signal generating device 116 and configured to output the usage signal generated by the usage signal generating device 116.

As described above, the usage signal is used by the watch display device 102 to display the time. Thus, it can be seen that the clock generation in the watch 100 is based on the propagation speed of light (speed of light) in the light wave guide 20. Thus, the watch 100 is as accurate as possible.

To drive the gear train 104, the drive device 101 comprises preferably a drive spring.

Figure 3:
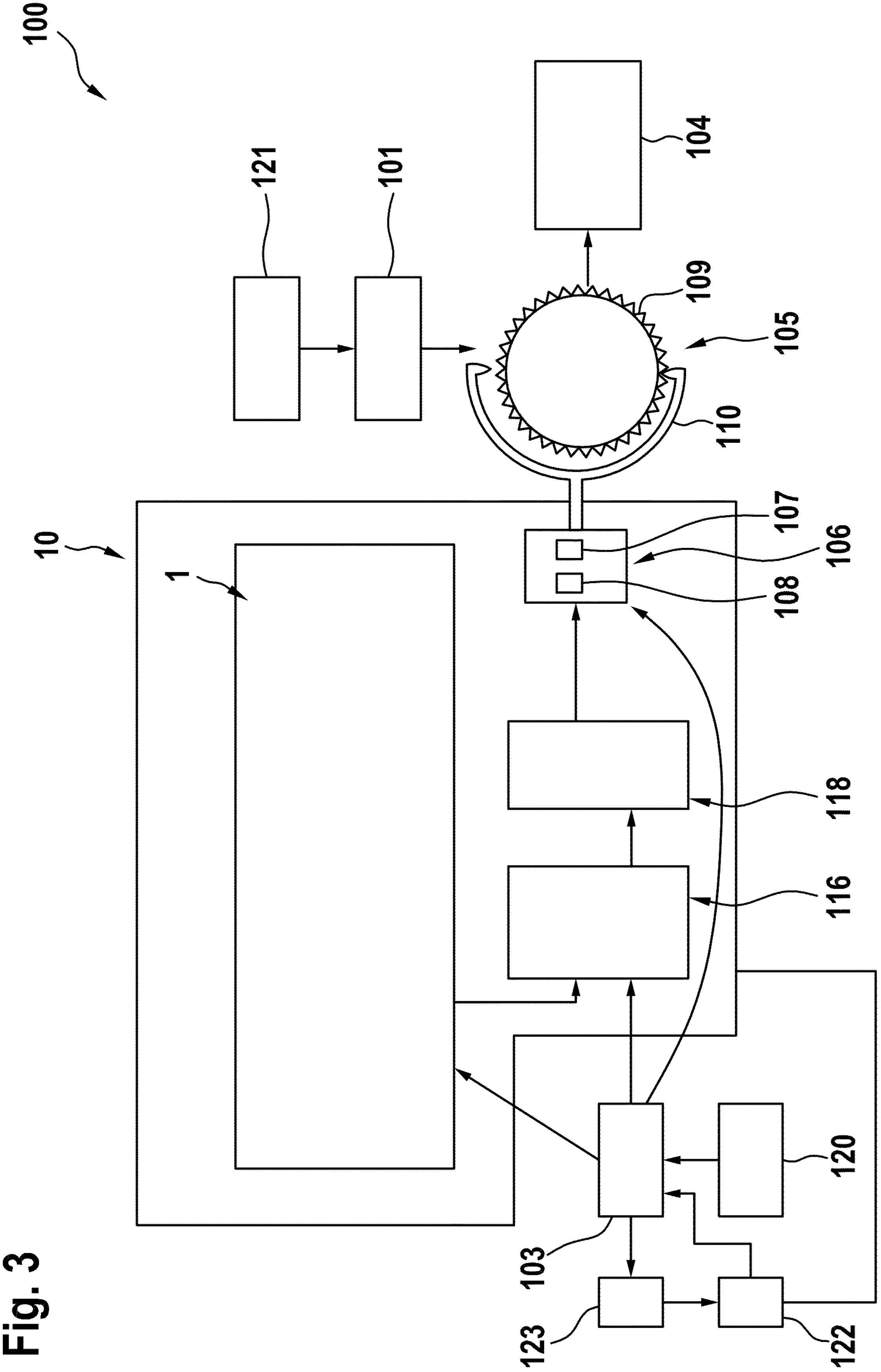

FIG. 3 shows that a winding device 121 is provided in the watch 100 for winding and tensioning the drive spring. In particular, the watch 100 is formed as a self-winding watch. The winding device is an automatic winding device, which is in particular formed as an oscillation weight, so that the drive spring is automatically wound by the oscillation weight due to the movement of the hand of the wearer of the watch 100. When the drive spring is tensioned, this provides the energy required to drive the gear train 104. However, it is also possible for the watch 100 to be formed as a manual winding watch. In this case, the winding device 121 can be operated manually and with the hand.

Furthermore, the timer arrangement 10 comprises an electromechanical device 106. The electromechanical device 106 is formed in particular as an actuator which, according to FIG. 4, comprises a magnetic core (magnetic anchor) 107 and a magnetic coil 108. The magnetic coil 108 interacts with the magnetic core 107. In particular, the magnetic coil 108 is configured to move the magnetic core 107, when it is supplied with current.

The electromechanical device 106 is movable via the usage signal generated by the electronic usage signal generating device 116 and the usage signal output by the output device 118. As a result, the electromechanical device 106, in particular the magnetic core 107, engages with the gear train 104 in a clocked manner.

As can also be seen from FIG. 3, the watch 100 also comprises an escapement 105, which is disposed between the timer arrangement 10, in particular the electromechanical device 106, and the gear train 104. Thus, the electromechanical device 106, in particular the magnetic core 107, indirectly engages with the gear train 104 via the escapement 105. The escapement 105 is driveable via the electromechanical device 106.

In particular, the electromechanical device 106 indirectly engages in the gear train 104 in an inhibiting manner to bring the gear train 104 alternately to a standstill and release it again.

Figure 4:
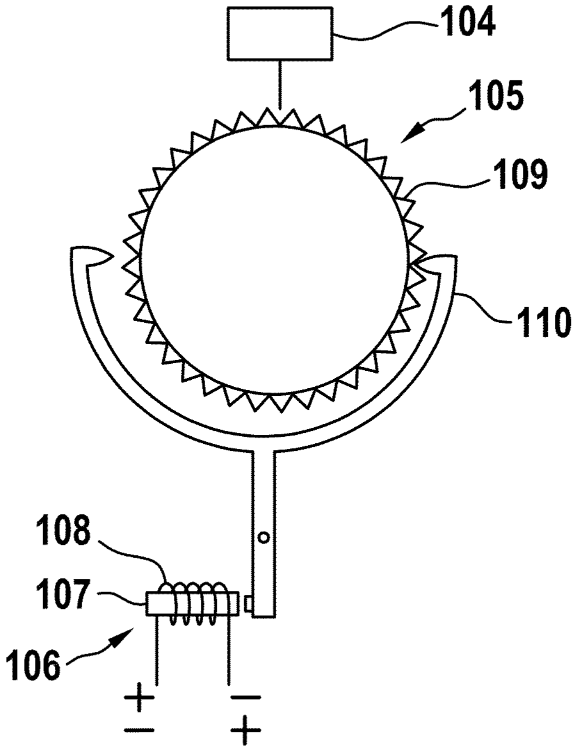

FIGS. 3 and 4 show that the escapement 105 comprises an escapement wheel 109 and an escapement piece 110 and is formed in particular as an anchor escapement. The escapement wheel 109 is in engagement with the gear train 104, wherein the magnetic core 107 can be brought into engagement with the escapement piece 110 by its movement. In particular, the escapement piece 110 is driveable via the magnetic core 107.

In particular, the magnetic coil 108 builds up and reduces a magnetic field in the rhythm of the usage signal, whereby the magnetic core 107 is also moved back and forth in the rhythm of the usage signal. The movable magnetic core 107 then engages with the escapement 110.

Thus, the timer arrangement 10 replaces a conventional balance wheel of a mechanical watch.

For the power supply of the oscillation system 1, the electronic usage signal generating device 116 and the electromechanical device 106, the watch 100 is equipped with a power supply device 103, which is formed as a rechargeable battery. The rechargeable battery can be charged by an energy harvesting device 120.

The energy harvesting device 120 can preferably comprise at least one thermogenerator and/or at least one solar cell. In particular, the thermogenerator can comprise a Peltier element.

For example, the dial 12 of the watch 100 can be formed as a solar cell. It is also possible that a solar cell is arranged under the dial 12. In this case, the dial 12 must either be formed semi-transparently or comprise a recess at the position of the arrangement of the solar cell. When the watch 100 is provided with a thermogenerator, this can preferably be arranged on the case back of the watch 100. In this way, it can generate electricity from a difference between the skin temperature of the wearer of the watch 100 and the temperature of the surroundings of the watch (and thus the temperature of the rest of the watch). It is also possible that the at least one solar cell and/or the at least one thermogenerator is/are built into the wristband 16 of the watch 100.

In normal operation of the watch 100, in which the drive spring provides the energy required to drive the gear train 104, the oscillation system 1 is first caused to oscillate.

Based on the frequency of the electrical signal between the opto-electrical converter 4 and the electro-optical converter 3, the usage signal generating device 116 generates a usage signal with a usage frequency via the frequency divider 117 and the pulse counter.

The usage signal at the desired rhythm is then output to the electromechanical device 106. This allows the electromechanical device 106 to control the escapement 105, in that the electromechanical device 106 moves the escapement piece 110 at the time of the usage signal output. Via the frequency-controlled controlling of the frequency of the escapement (based on the frequency of the electrical signal), the gear train 104 can be clocked.

The watch 100 further comprises a charge state measuring device 122 configured to measure a charge state of the rechargeable battery. Furthermore, the watch 100 comprises a control unit 123, which is preferably configured to control the electronic timer arrangement 10.

When the drive spring (drive device 101) is de-energized, the electromechanical device 106 can be configured to move in such a way that the electromechanical device 106, in particular the magnetic core 107, drives the gear train 104. This can ensure that the watch 100 continues to run, even when the drive spring can no longer supply the required mechanical energy. This can be the case, for example, when the watch 100 is not used for some time, for example during the night, as a result of which the drive spring cannot be tensioned by the automatic winding device 121. For this purpose, the watch 100 can preferably be provided with a device for decoupling the drive device 101, i.e. the drive spring, from the gear train 104 and the escapement 109. Thus, by decoupling the drive spring, the electromechanical device 106 can be prevented from also moving the drive spring when the escapement 109 is operated by the electromechanical device 106.

When the charge state of the rechargeable battery measured by the charge state measuring device 122 is less than a predetermined charge state value, the control device 123 is configured to interrupt the power supply to the electromechanical device 106. In this way, a complete discharge of the rechargeable battery can be avoided. In other words, the power supply to the electromechanical device 106 is interrupted from a given minimum energy level in the rechargeable battery, until the drive spring is tensioned again by the movement of the watch 100. Otherwise, the rechargeable battery would be completely discharged and would therefore not be able to operate the electromechanical device 106 immediately when the watch 100 is restarted and would not be able to start the oscillation process in the oscillation system 1.

The present invention provides a watch 100, which is more accurate than a mechanical watch while being driven like an automatic watch. In other words, the watch 100 is a hybrid watch in which the clocking is controlled via a light-driven oscillation system and the gear train is driven by a drive spring. The watch 100 further comprises a high power reserve due to the rechargeable battery, which supplies the components of the watch 100 functioning with electricity accordingly and is rechargeable by the energy harvesting device 120.

Figure 5:
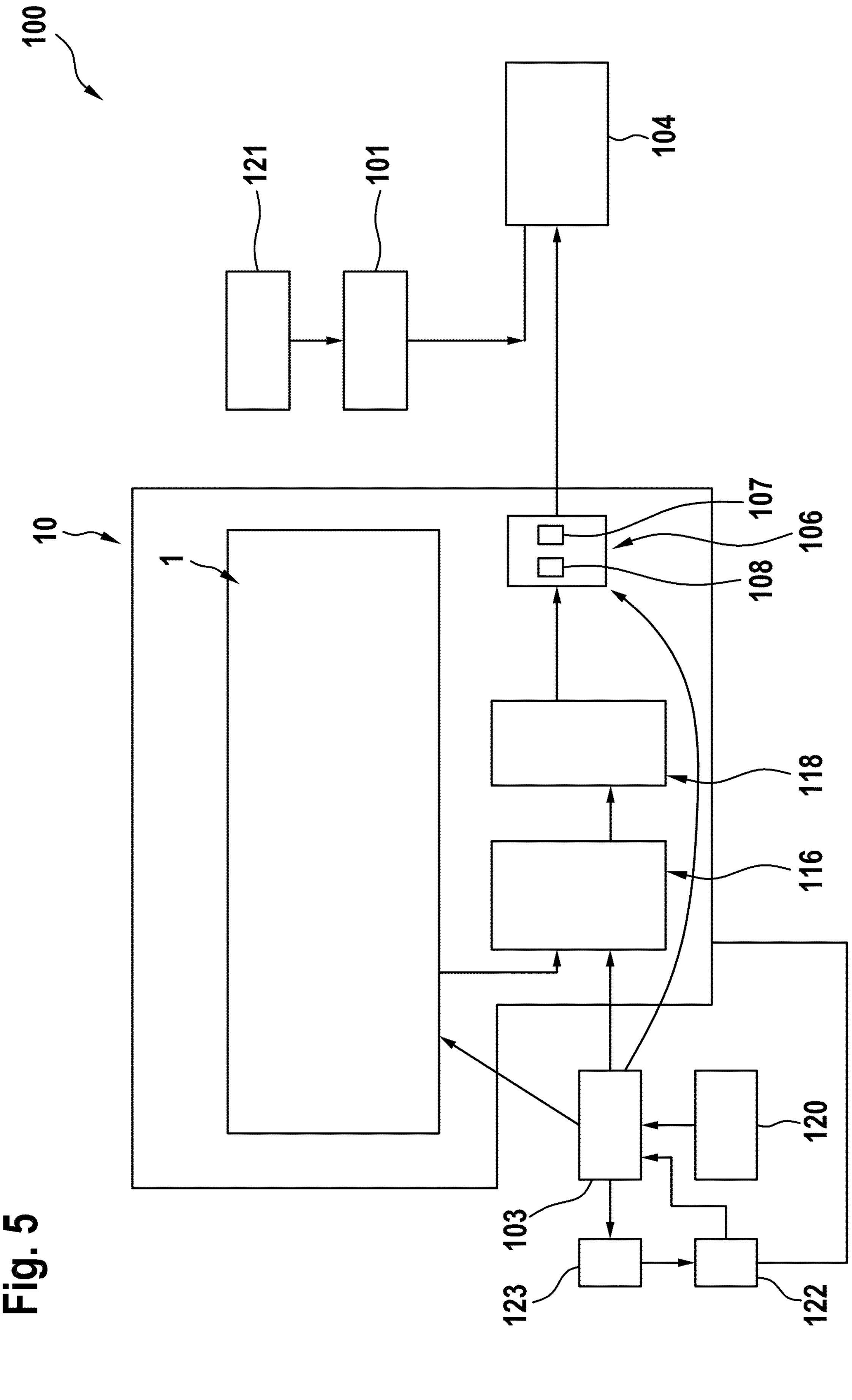
Figure 6:
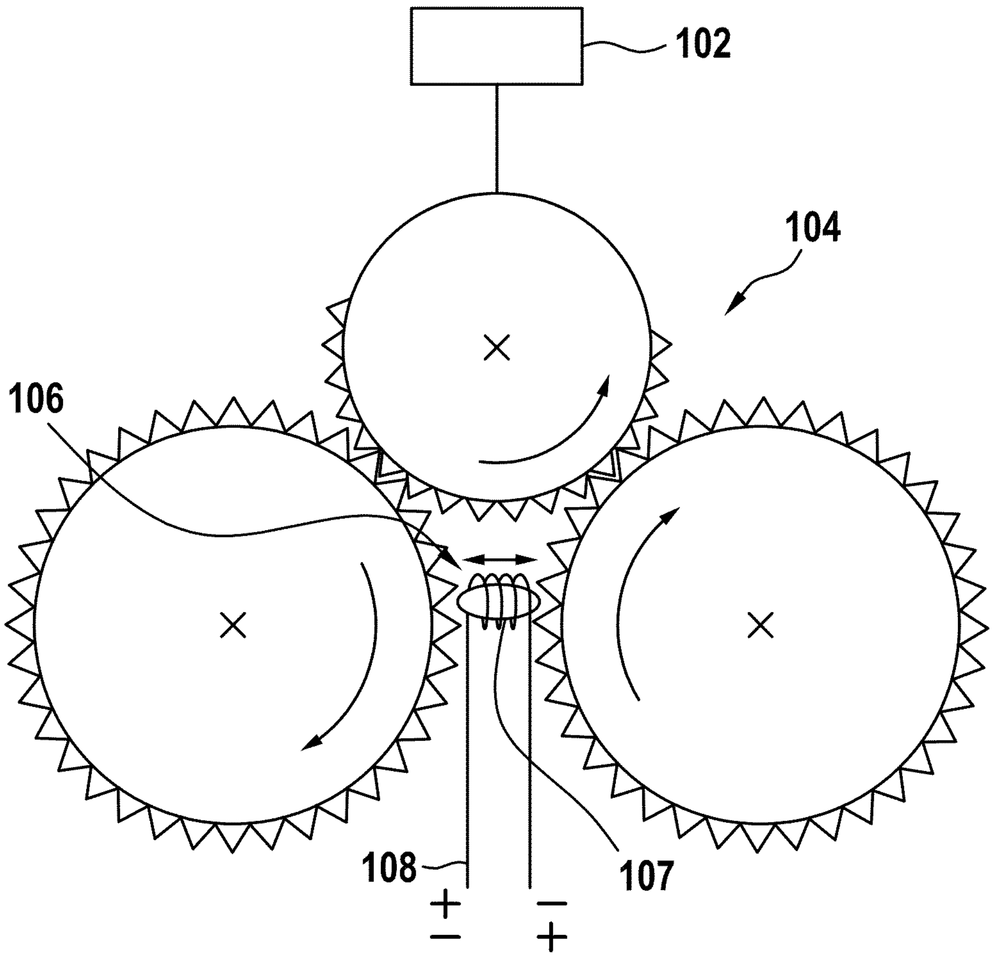

FIGS. 5 and 6 refer to a watch 100 according to a second embodiment of the invention.

The watch 100 according to the second embodiment differs from the watch 100 according to the first embodiment in that the electromechanical device 106 in the watch 100 according to the second embodiment directly engages with the gear train 104 in a clocked manner. In other words, no escapement is provided in the watch 100 according to the second embodiment. This means that the timer arrangement 10 here replaces the combination of a conventional balance wheel and a conventional escapement of a conventional mechanical watch.

In particular, the electromechanical device 106 directly engages the gear train 104 in an inhibiting manner to bring the gear train 104 alternately to a standstill and release it again.

In the watch 100 according to the third embodiment, the electromechanical device 106 is also formed as an actuator comprising a magnetic core 107 and a magnetic coil 108.

Thus, the magnetic core 107 engages directly in a clocked manner in the gear train 104.

However, it is also possible that the electromechanical device 106 is formed as a stepper motor which engages directly in a clocked manner in the gear train 104.

Figure 7:
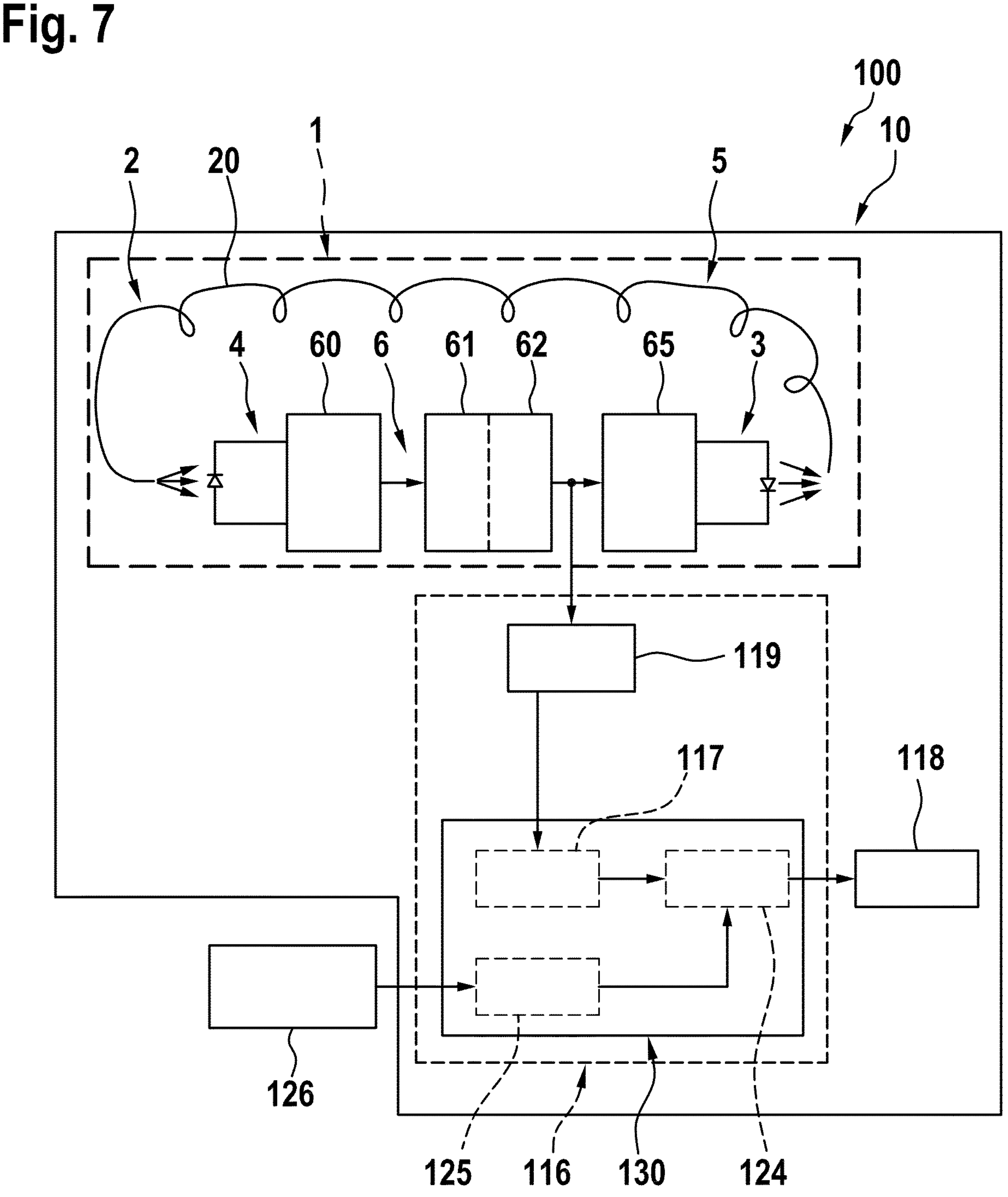

With the exception of the special features described for the watch 100 according to this embodiment, its mode of operation corresponds in principle to that of the watch 100 according to the first embodiment. However, the electromechanical device 106 does not control an escapement, but rather the gear train 104 directly, which is thus clocked. FIG. 7 refers to a watch 100 according to a third embodiment of the invention. The watch 100 according to the third embodiment differs from that according to the first or second embodiment in the structure of the oscillation system 1.

In contrast to the oscillation system 1 of the watch 100 according to the previous embodiments, the oscillation system 1 comprises here no frequency filter and no Schmitt trigger, but a trigger 61 and a monoflop 62. The trigger 61 is disposed in the direction of the electrical signal in the electrical signal path 6 after the electrical amplifier 60.

The trigger 61 is configured to control the monoflop 62 via the electrical signal from the opto-electrical converter 4, in particular via the amplified electrical signal downstream of the electrical amplifier 60. The monoflop 62 is thereby configured to generate an output pulse for controlling the electro-optical converter 3.

The electro-optical converter 3 is adapted to feed a light pulse into the light wave guide arrangement 2, in particular directly into the light wave guide 20. The opto-electrical converter 4 is adapted to receive the light pulse and convert it into a current pulse.

To operate the watch 100, a light pulse is first sent from the electro-optical converter 3 through the light wave guide 20. Due to the length of the light wave guide 20, the light pulse travelling in a direction from the electro-optical converter 3 to the opto-electrical converter 4 takes a given time duration to arrive at the opto-electrical converter 4. With other words, this time duration is predetermined by the length of the light wave guide 20. The opto-electrical converter 4 converts the light pulse into a current pulse and sends it to the electrical amplifier 60. The electrical amplifier 60 amplifies the current pulse and converts it into a voltage pulse. Via the trigger 61, this voltage pulse controls the monoflop 62, which generates a short pulse with a precisely defined duration (approx. 1 ns or less). This pulse is used to control the driver 65 of the electro-optical converter 3, so that the electro-optical converter 3 emits a light pulse again. The circuit is thus closed.

The electro-optical converter 3 has a duty cycle of 1% or less and therefore requires very little energy.

This process is repeated a given number of times per second. The number of repetitions per second is determined by the length of the light wave guide 20. With a length of approx. 20 meters, the process is repeated 10 million times per second. This results in an oscillation frequency of the oscillation system 1 of 10 MHz, which is caught as the frequency of the electrical signal (pulse sequence) between the monoflop 62 and the driver 65.

Based on the frequency of the electrical signal between the monoflop 62 and the driver 65, the usage signal generating device 116 generates the usage signal, by which the watch 100 is clocked in the same manner as the watch 100 according to the first or second embodiment.

Figure 8:
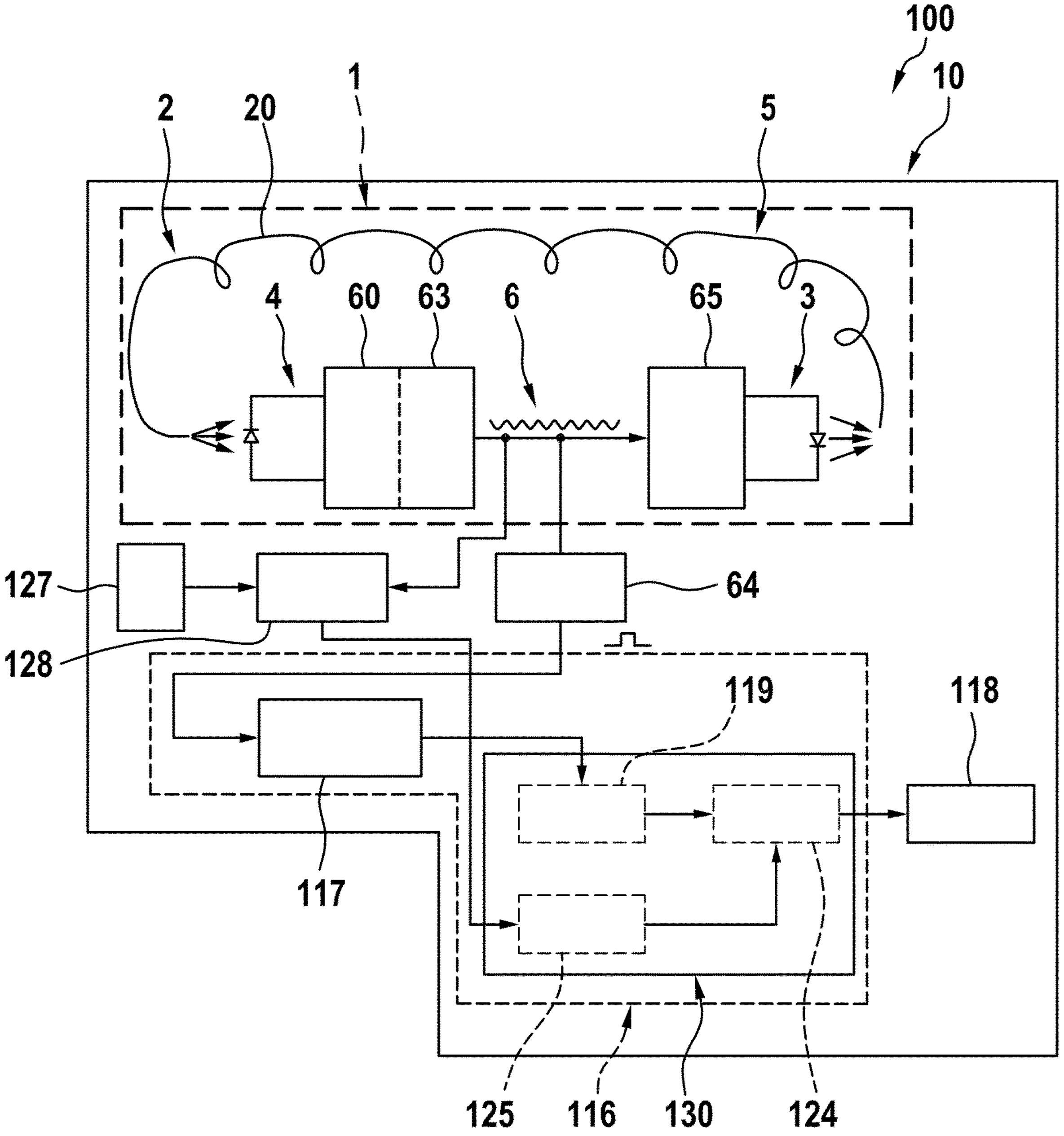

FIG. 8 refers to a watch 100 according to a fourth embodiment of the invention.

The structure of the oscillation system 1 of the watch 100 according to the fourth embodiment of the invention corresponds to the structure of the oscillation system 1 of the watch 100 according to the first embodiment (see FIG. 2).

However, the watch 100 according to the fourth embodiment uses a different method for temperature compensation with regard to the generation of the usage signal.

A crystal oscillator 127 with a predetermined crystal oscillator oscillation frequency is arranged in parallel with the oscillation system 1 in the timer arrangement 10. Preferably, the crystal oscillator can comprise a quartz crystal or a tourmaline crystal.

To achieve the predetermined crystal oscillator frequency, a corresponding cut shape and measurement of the crystal is selected, such that the predetermined crystal oscillator frequency, e.g. 10 MHz, is obtained.

Furthermore, a mixer 128 is provided in the timer arrangement 10. The mixer 128 is connected to the crystal oscillator 127 and the electrical signal path 6 and is configured to superimpose an electrical signal of the crystal oscillator 127 with an electrical signal caught from the oscillation system 1 between the opto-electrical converter 4 and the electro-optical converter 3, in particular between the frequency filter 63 and the driver 65.

The superposition of the two electrical signals produces a sinusoidal electrical signal, the frequency of which corresponds to a difference between the frequency of the electrical signal caught from the oscillation system 1 and the electrical signal of the crystal oscillator 127.

If the two frequencies are exactly the same, a beat signal with the frequency 0 is generated, i.e. a DC voltage signal. If the frequencies are not equal, an alternating voltage signal with the difference frequency is generated.

If the length of the light wave guide 20 and the speed of light change with the temperature and, if necessary, the crystal oscillator frequency of the crystal oscillator also changes, if this is temperature-sensitive, this results in a beat frequency, which is dependent on the temperature.

By selecting the two output frequencies appropriately, it is possible to ensure that this beat frequency never becomes completely zero in the expected operating temperature portion of the watch and depends on the temperature in an unambiguous manner.

This beat frequency can be measured. In particular, the dependencies of the oscillation frequency of the oscillation system 1 and the beat frequency on the temperature are measured once. Thus, it can be calculated and stored in a correction table or correction function how the predetermined count value, with which a count value of the pulse counter 119 in the comparator 124 is compared, must be corrected, so that the usage signal generating device 116 provides a usage signal with the correct duration regardless of the temperature of the oscillation system 1 and/or the watch 100 in the surroundings of the oscillation system 1.

In other words, the usage signal generating device 116 is adapted to compare the frequency of the electrical signal caught from the oscillation system with the crystal oscillator oscillation frequency to generate an actual comparison value. Based on the frequency of the electrical signal and the actual comparison value, the usage signal generating device 116 can generate the usage signal.

In particular, multiple temperature-dependent memory comparison values and associated correction values can be stored in the memory 125. The usage signal generating device 116 can be adapted to assign the actual comparison value to a memory comparison value and to generate the usage signal based on the frequency of the electrical signal and the correction value.

Figure 9:
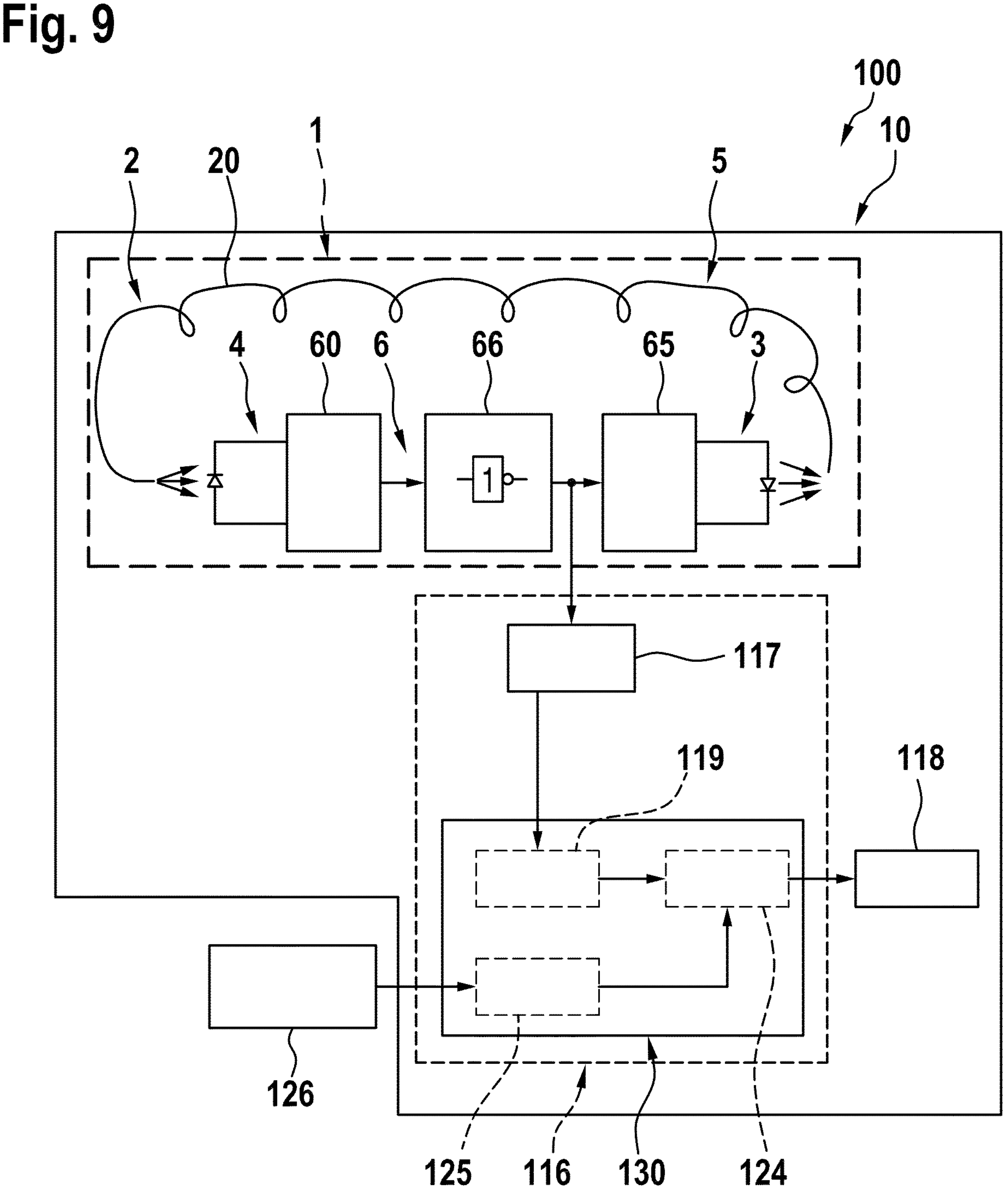

FIG. 9 refers to a watch 100 according to a fifth embodiment of the invention.

The watch 100 according to the fifth embodiment differs from that according to the third embodiment in that an inverter (inverter circuit) 66 is disposed between the electrical amplifier and the driver 65 instead of the trigger 61 and the monoflop 62 in the watch according to the fifth embodiment. Thus, the electrical signal path 6 is adapted to invert the electrical signal between the opto-electrical converter 4 and the electro-optical converter 3.

The inverter 66 is preferably adapted to alternately switch the electro-optical converter 3 on and off via the driver 65.

To achieve the same effect, an output of the electrical amplifier 60, which as already mentioned is formed in particular as a transimpedance amplifier, can be an inverting output. The inverting output is used to invert the electrical signal between the opto-electrical converter 4 and the electro-optical converter 3 and thus also to switch the electro-optical converter 3 on and off alternately. Alternatively, it is also possible for an input of the driver 65 to be formed as an inverting input. Both in the case of an inverting output of the electrical amplifier 60 and an inverting input of the driver 65, the inverter 66 can be omitted.

During operation of the watch 100 according to this embodiment, the electro-optical converter 3 supplies a light signal to the light wave guide 20. The light signal passes through the light wave guide 20 and takes a given amount of time to do so. For a distance of approximately 10 meters, for example, the light requires approximately one 20-millionth of a second. When the light signal arrives at an end of the light wave guide, it hits the opto-electrical converter 4. It notes the arrival of the light signal and converts it into a current signal. The electrical amplifier 60 amplifies the current signal and converts it into a voltage signal, which is sent to the inverter 66.

When this voltage signal arrives, the inverter 66 sets its output signal to zero and thus switches off the electro-optical converter 3 via the driver 65. After the typical transit time for the light wave guide 20 (at 10 m, for example, approximately one 20-millionth of a second, as already mentioned), the light signal still disposed in the light wave guide 20 has completely reached the opto-electrical converter 4. It then receives no light signals any more, whereupon the input signal and thus also the output signal of the electrical amplifier drops to zero.

As a result, the inverter 66 increases its output signal again and thus switches on the electro-optical converter 3 via the driver 65. This sends another light signal into the light wave guide 20. The light signal arrives at the opto-electrical converter 4 after the typical transit time for the light wave guide 20 and generates an output signal formed as a voltage signal at the electrical amplifier 60. When this voltage signal starts, the inverter 66 sets its output signal to zero again and switches the electro-optical converter 3 off.

This cycle is repeated regularly, wherein a square-wave signal is generated at the output of the electrical amplifier 60, the period duration of which corresponds to twice the typical transit time for the light wave guide 20. With a length of the light wave guide 20 of approx. 10 m, this results in a frequency of the square wave signal of 10 MHz. This rectangular signal is the time base for the watch 100.

This square wave signal enters the usage signal generating device 116 for generating the usage signal.

The watch 100 according to the fifth embodiment comprises the advantage that the oscillation system 1 is a digital oscillator that generates a square wave signal. The signal processing is digital and the resulting square-wave signal can be processed directly without further conditioning.

Thanks to the fact that per oscillation cycle not only one signal is sent from the opto-electrical converter 4 to the electro-optical converter 3, but two signals (one signal for switching on the electro-optical converter 3 and one signal for switching off the electro-optical converter 3), the length of the optical wave guide 20 can be halved at the same frequency of the oscillation system 1. This is of particular advantage, when the watch 100 is formed as a wristwatch, because space can be saved in the watch case 11 or the watch case, and thus also the watch 100 can be made smaller.

Conversely, if a desired length of the light wave guide 20 is maintained, the oscillation frequency of the oscillation system 1 can be halved in the watch 100 according to the fifth embodiment. For example, when the light wave guide 20 is 20 meters long, the oscillation frequency of the oscillation system 1 corresponds to half of the oscillation frequency at the same length of the light wave guide 20 of the watch 100 according to one of the previous embodiments. Because the power consumption for some electronic functions does not increase linearly with increasing frequency, but increases by the square, the power consumption for the electronics of the watch 100 according to the fifth embodiment can be much lower as a result.

Figure 10:
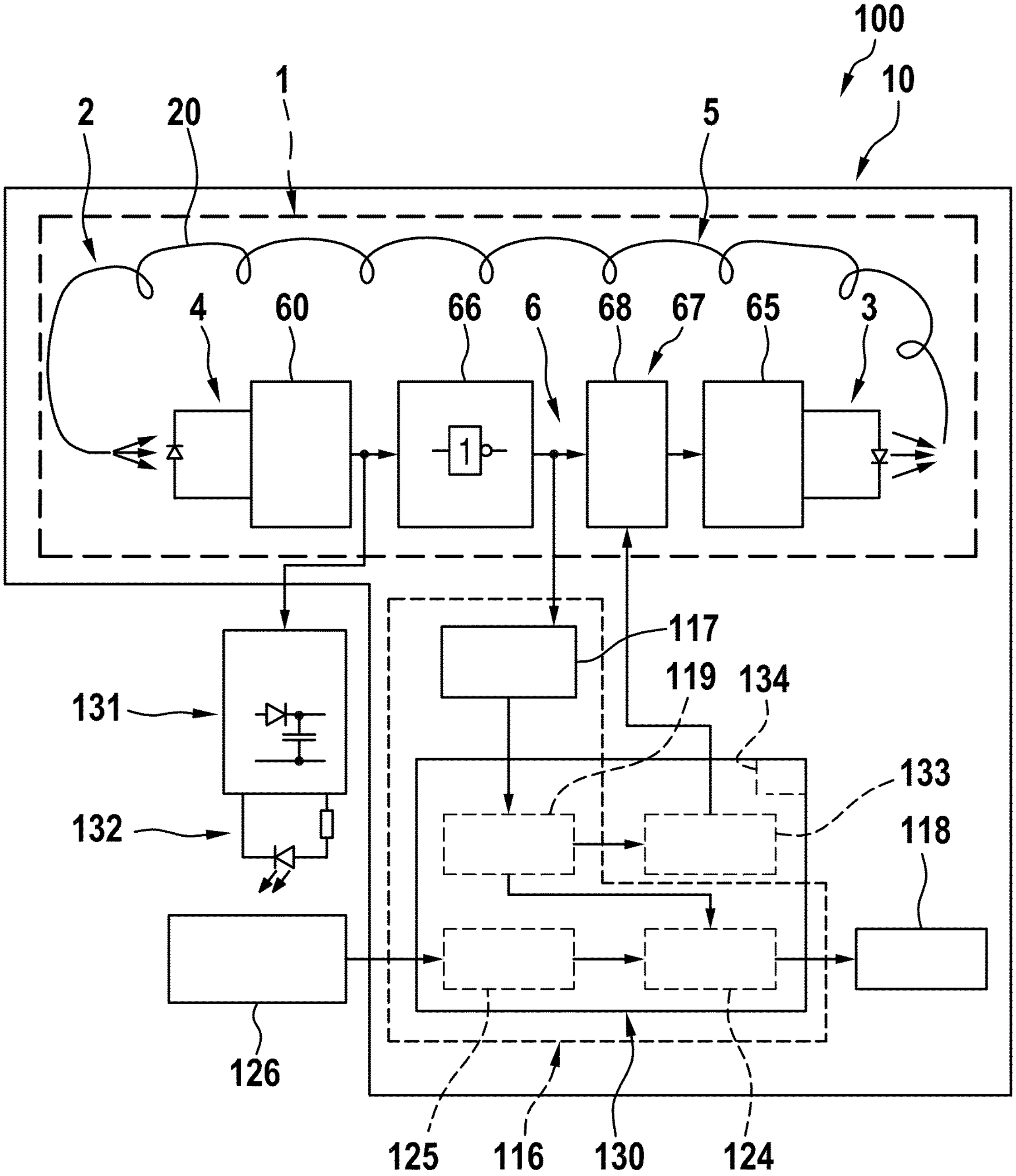

FIG. 10 refers to a watch 100 according to a sixth embodiment of the invention.

The oscillation system 1 of the watch 100 according to the sixth embodiment corresponds in principle to the oscillation system 1 of the watch 100 according to the fifth embodiment. The only difference is that a data unity 67 is arranged between the inverter 66 and the driver 65, which comprises a modulator 67 for modulating the input signal of the electro-optical converter 3 based on a data set.

Preferably, the watch 100 comprises a memory unit 133 for storing a data set, an input unit 134 for inputting a data set, a readout unit 131 for reading out the data set from the modulated output signal of the opto-electrical converter 4, and an output unit 132 for outputting information based on the readout data set. In particular, the memory unit 133 and the input unit 134 are parts of the microcontroller 130.

The information can comprise, for example, a light and/or a sound and/or an electrical data signal, which can preferably be output via WLAN or Bluetooth. The output unit 132 is then configured and formed correspondingly to output such information. In FIG. 10, the output unit 132 is drawn as a light-emitting diode.

Preferably, the data set can comprise a personal resolution, such as a resolution to quit smoking, or a name of a loved person, a personal target or ideal, but also a religious message such as a mantra.

Advantageously, the data set can be light encoded and orbited with the speed of light in oscillation system 1.

Coding is possible by modulating the amplitude (voltage) of the square-wave oscillation. This modulation can be performed via the modulator 68 via the driver 65 of the electro-optical converter 3. The driver 65 can position the electro-optical converter 3, for example, on full intensity or on half intensity.

In this manner, the amplitude of the light signal travelling through the light wave guide is modulated. If the electrical amplifier 60 is set appropriately, this has no influence on the oscillation frequency of the oscillation system 1 being set. The accuracy of the time base is not influenced by this. This different amplitude can be indicated, for example, by a light-emitting diode on the driver 65, which then lights up with different brightness.

In other words, a watch 100 with a square wave signal is provided by alternately switching the electro-optical converter 3 on and off. In the square wave signal, each oscillation period comprises the same duration, but in which the amplitude of the oscillation itself, i.e. the intensity of the light signal, varies.

For example, a Morse alphabet with signal pulses of different lengths can be used as coding. Here, the code for "S" is a short signal repeated three times and the code for "O" is a long signal repeated three times. "SOS" would then be: short-short-short-long-long-long-short-short-short. To graft this code to the oscillation system 1 with a time base of, for example, 10 MHz, corresponding to a period of 100 ns, the intensity of the individual light pulses can be designed, so that two million light pulses (corresponding to 200 ms time duration) with full intensity correspond to a dit and that two million light pulses (corresponding to 200 ms time duration) with half intensity correspond to a pause (Morse time base). This corresponds to a Morse code with six words per minute according to the PARIS standard. Morse light pulses with this speed are easy to recognize and identify, even for inexperienced users.

If a dit is termed with a "1" and a pause with a "0", this Morse pulse sequence corresponds to the word "SOS":

| |
|---|
| 1010100011101110111000101010000000 |

The length of this word (including pauses) is 34 dits, the total duration is 34 dits *0.2 s=6.8 s.

The Morse time base can be taken from a suitable binary digit of the pulse counter 119 or frequency divider 117 or can be specified by the microcontroller 130. The message (data set) to be transmitted is stored in the memory unit 133 of the microcontroller 130 as a Morse pulse sequence. Alternatively, this can be stored in a binary shift register of the microcontroller 130.

The Morse code is stored in the memory unit 133 and is applied to a digital output of the microcontroller 130 with a suitable readout speed. The pause corresponds to a zero, the dit corresponds to the full output voltage of the microcontroller 130. This output signal is superimposed at the modulation input of the driver 65 with the signal coming from the inverter 66.

The superimposition works in such a way that without a microcontroller signal (pause), the electro-optical converter 3 is set at half intensity with a voltage signal coming from the inverter 66. If a microcontroller signal (Dit) is present, the signal at the modulation input of the driver 65 increases with a voltage signal from the inverter 66, so that the electro-optical converter 3 is set to full intensity. A corresponding logic circuit can be used to ensure that the signal at the modulation input of the driver 65 is zero, when a voltage signal is coming from the microcontroller 130 but not from the inverter 66.

The modulation of the light wave can be read out at the output of the electrical amplifier 60 with the readout unit 131, which in particular is formed as a peak detector. A threshold value of the peak detector is set, so that the peak detector only provides an output signal during an optical Dit pulse train, with which the output unit 132 is then controlled.

Figure 11:
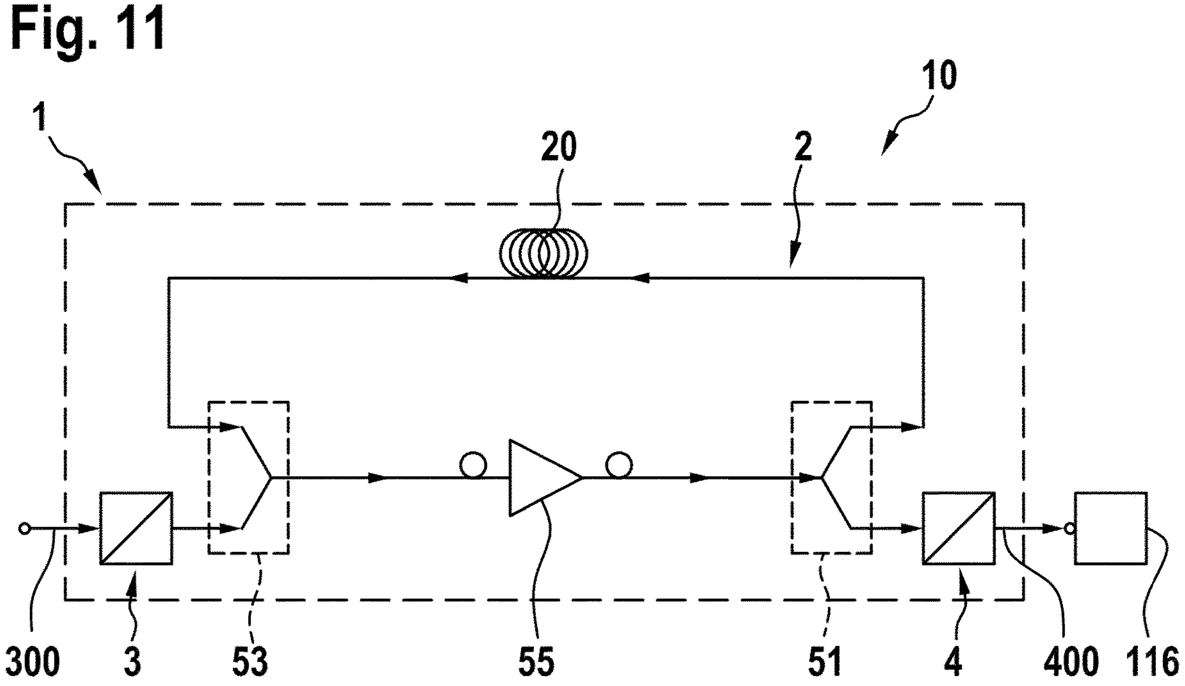

FIG. 11 refers to a watch 100 according to a seventh embodiment of the invention. In FIG. 11, the oscillation system 1 and the usage signal generating device 116 of the timer arrangement 10 are shown. The usage signal generating device 116 can be advantageously formed in the same manner as one of the usage signal generating devices 116 of the embodiments described above. The oscillation system 1 can be connected directly or indirectly with the usage signal generating device.

Analogous to the oscillation systems 1 of the watch 100 according to the previous embodiments, the oscillation system 1 comprises a light wave guide arrangement 2 comprising a light wave guide 20, an electro-optical converter 3 adapted to feed a clocked light signal to the light wave guide arrangement 2, and an opto-electrical converter 4 receiving the light signal from the light wave guide 20 and adapted to generate an electrical signal based on the received light signal.

In particular, the electro-optical converter 3 is adapted to feed an input signal 300, which is applied to its electrical input, once or repeatedly at given time intervals.

Here, the light wave guide arrangement 2 is formed as an endless loop (closed optical loop). The timer arrangement 10 further comprises an optical splitter 51 for decoupling the light signal from the endless loop into the opto-electrical converter 4 and an optical coupler 53 for coupling the light signal from the electro-optical converter into the endless loop.

Furthermore, an optical amplifier 55 is arranged in the light wave guide arrangement 2 formed as an endless loop. In particular, the optical amplifier 55 is disposed between the optical coupler 53 and the optical splitter 51.

The output of the light wave guide 20 is connected to a first input of the optical coupler 51. The output of the optical coupler 53 is connected to the input of the amplifier 55. The output of the optical amplifier 55 is connected to the input of the optical splitter 51, the first output of which is connected to the input of the light wave guide 20. The optical output of the electro-optical converter 3 is connected to a second input of the optical coupler 53. A second output of the optical splitter 51 is connected to an input of the opto-electrical converter. The electrical signal is available at the output of the opto-electrical converter 4 as output signal 400. A usage signal can be generated from this electrical signal via the usage signal generating device 116 in the manner already described with reference to the watch 100 according to the previous embodiments.

After the transit time of the light signal through the light wave guide 20, the light signal reaches its output and thus also the input of the light wave guide 20 again. The transit time $t_{d,LWL}$ through the light wave guide 20 depends on its length $l_{LWL}$ and the speed of light $c_{LWL}$ in the light wave guide 20 as follows:

$$t_{d,LWL} = \frac{l_{LWL}}{c_{LWL}}$$

With a length $l_{LWL}$=20"m" of the light wave guide 20 and an approximate speed of light in the light wave guide of 200,000,000 m/s, the approximate transit time $t_{d,LWL}$≈100"ns". The light signal thus appears at the output every 100 ns and can be caught there with the optical splitter 51 and used to generate the usage signal.

Figure 12:
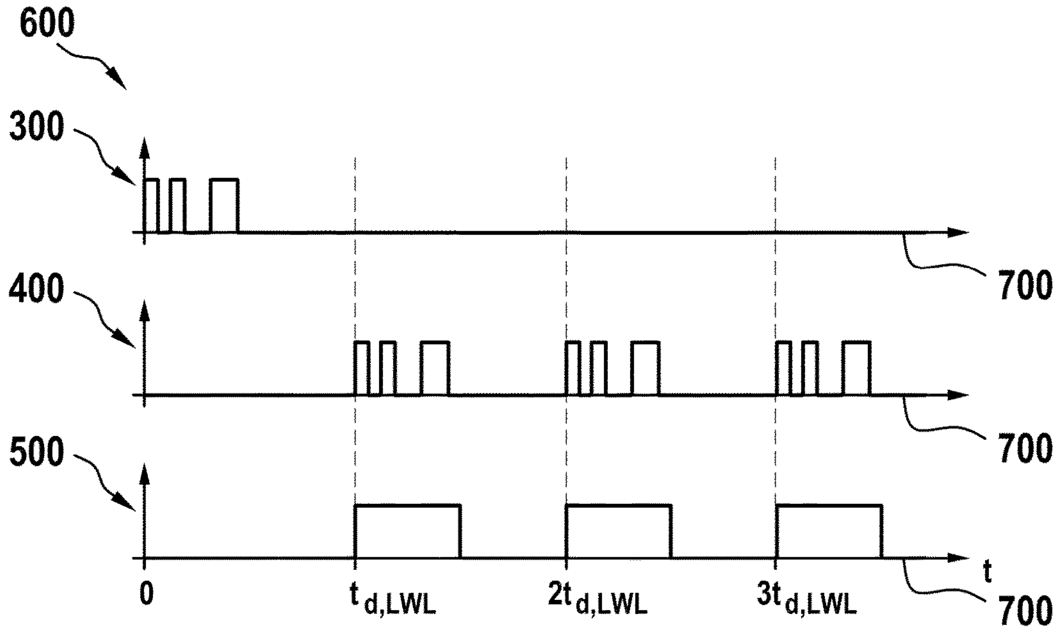

FIG. 12 demonstrates the function of the clock signal generation using a signal-time diagram 600. The diagram 600 shows the course of the input signal 300, the output signal 400 and the usage signal 500 in light of time 700.

The input signal 300 is supplied at the time t=0. The input signal in FIG. 12 is a bit sequence. Any information can be stored in the bit sequence, which can be personalized for each clock signal generation on customer request. The form in which and the method by which the signal is encoded and/or modulated is irrelevant for the clock generation function.

After passing through the light wave guide 20, the output signal 400 appears after the time $t=t_{d,LWL}$ at the output of the light wave guide 20 and thus also again at its input. As a result, the bit sequence reappears at the output of the light wave guide 20 at any time $t=n \cdot t_{d,LWL}$ with $n \in N$. The clock signal 500 shown can be generated from the output signal 400 in a simple manner.

Figure 13:
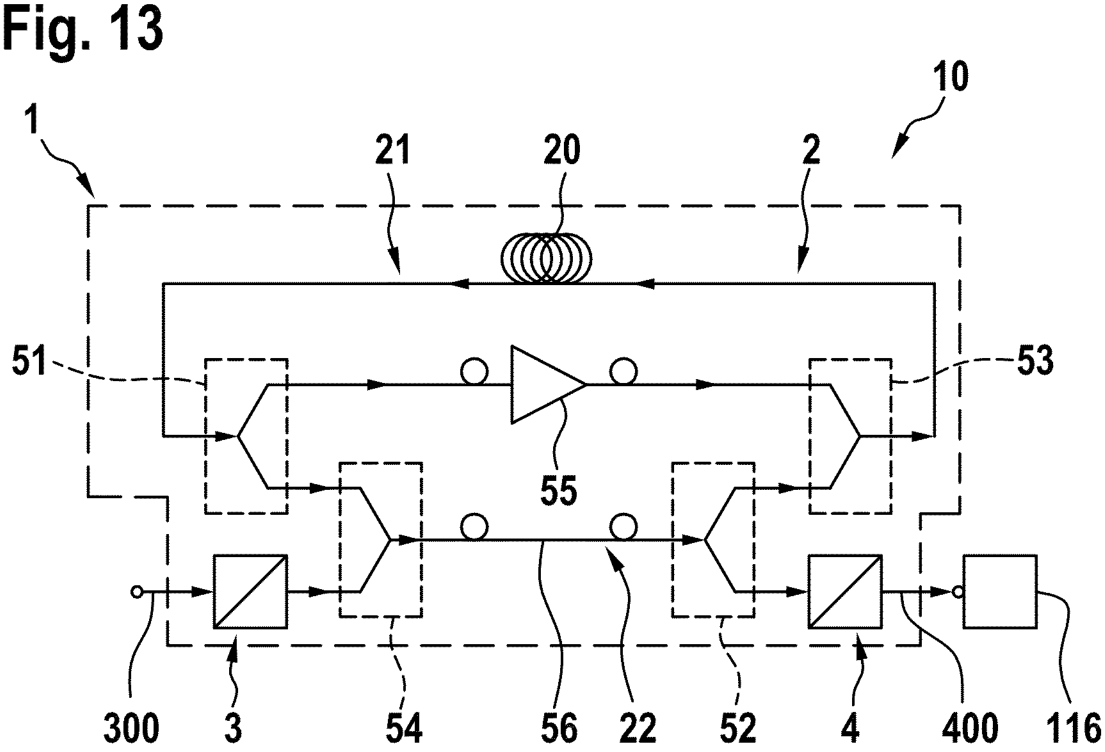

FIG. 13 refers to a watch 100 according to an eighth embodiment of the invention.

The oscillation system 1 in the watch 100 according to the eighth embodiment differs from that of the watch 100 according to the seventh embodiment by the following structure.

The light wave guide arrangement 2 here is subdivided into a first section 21 between the optical coupler 53 and the optical splitter 51 and a second section 22 between the optical splitter 51 and the optical coupler 53, wherein a delay of the light signal in the second section 22 corresponds to a delay of the parallel signal from the optical splitter 51 to the optical coupler 53.

In this case, the output signal of the light wave guide 20 is split via the splitter 51, which is hereinafter termed as first splitter 51. The first output of the first splitter 51 is connected to the input of the optical amplifier 55. The output of the optical amplifier 55 is connected to a first input of the coupler 53, which is hereinafter termed as first optical coupler 53. The output of the first optical coupler 53 is connected to the input of the light wave guide 20. The second output of the first splitter 51 is connected to a first input of a second optical coupler 54. Its output is connected to the input of a delay line 56. The signal reaches the input of a second optical splitter 52 via the output of the delay line 56. The first output of the second optical splitter 52 is connected to a second input of the first optical coupler 53.

The optical output of the electro-optical converter 3 is connected to a second input of the second optical coupler 54. A second output of the second optical splitter 54 is connected to an input of the opto-electrical converter 4. The electrical signal is available at the output of the opto-electrical converter 4 as output signal 400.

Any clock signal can be generated from this output signal via an electronic circuit in a known manner. The optical signal delay through the second optical coupler K2, the delay line VL and the second optical splitter S2 must correspond to the signal delay of the optical amplifier OV.

Due to the two parallel optical signal paths 51-54-56-52-53 and 51-55-53, it is possible to maintain a continuous signal flow in the endless loop via the light wave guide 20, even when the optical amplifier 55 is deactivated for a short time. This makes it possible to activate the optical amplifier 55, only when the optical signal power drops below a definable minimum value due to the attenuation in the endless loop. By switching the optical amplifier 55 on and off cyclically, the power consumption of the clock generation can be optimized as required.

In this embodiment of the watch 100, an electrical amplifier 60 is used instead of an optical amplifier 55. The optical output signal of the light wave guide 20 is split into two optical signal components via the optical splitter 51.

Figure 14:
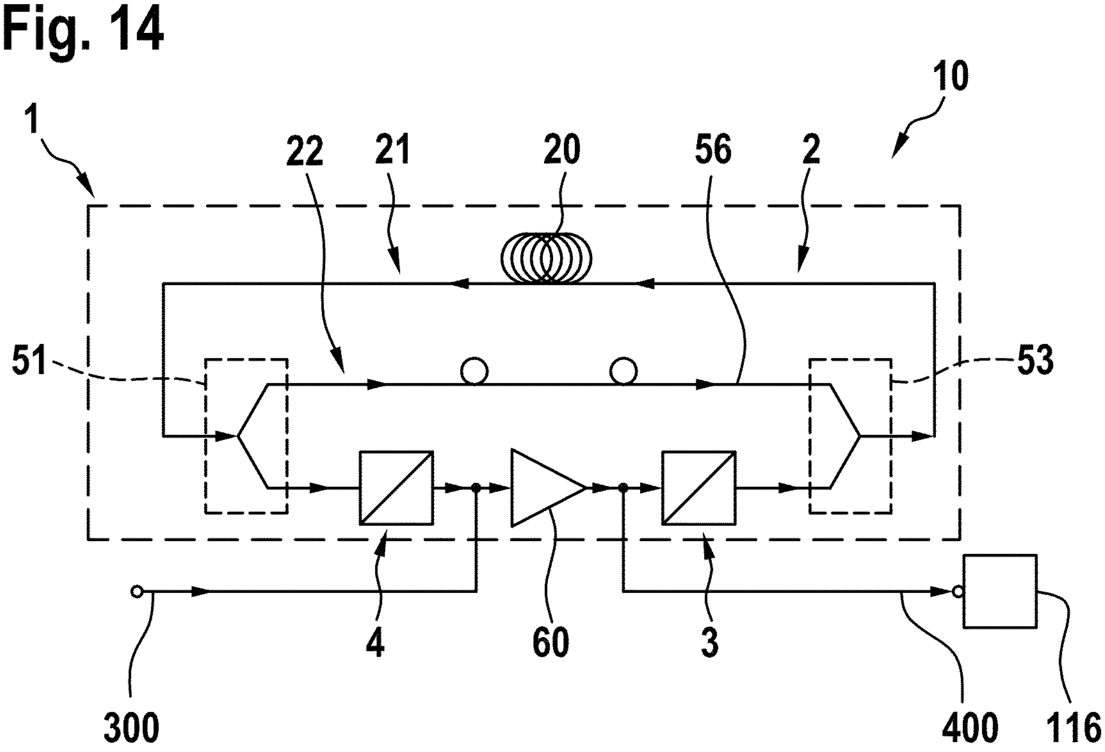

FIG. 14 refers to a watch 100 according to a ninth embodiment of the invention.

The first optical signal component is transmitted to a first input of an optical coupler 53 via a first output of the optical splitter 51 and via a delay line 56. The output of the optical coupler 53 is connected to the input of the light wave guide 20. Via a second output of the optical splitter 51, the second optical signal component is converted into an electrical signal via the opto-electrical converter 4. This signal is amplified with an electrical amplifier 60 and, after conversion into an optical signal, is transmitted via the electro-optical converter 3 to a second input of the optical coupler 53. The electro-optical converter 3 is controllable by the amplified and converted electrical signal of the opto-electrical converter 4.

In this usage signal generation, the input signal 300 is supplied between the opto-electrical converter 4 and the electrical amplifier 60. The output signal 400 is caught between the electrical amplifier 60 and the electro-optical converter 3. The total electrical and optical signal delay through the opto-electrical converter 4, the electrical amplifier 60 and the electro-optical converter 3 corresponds to the optical signal delay via the optical delay line 56.

Figure 15:
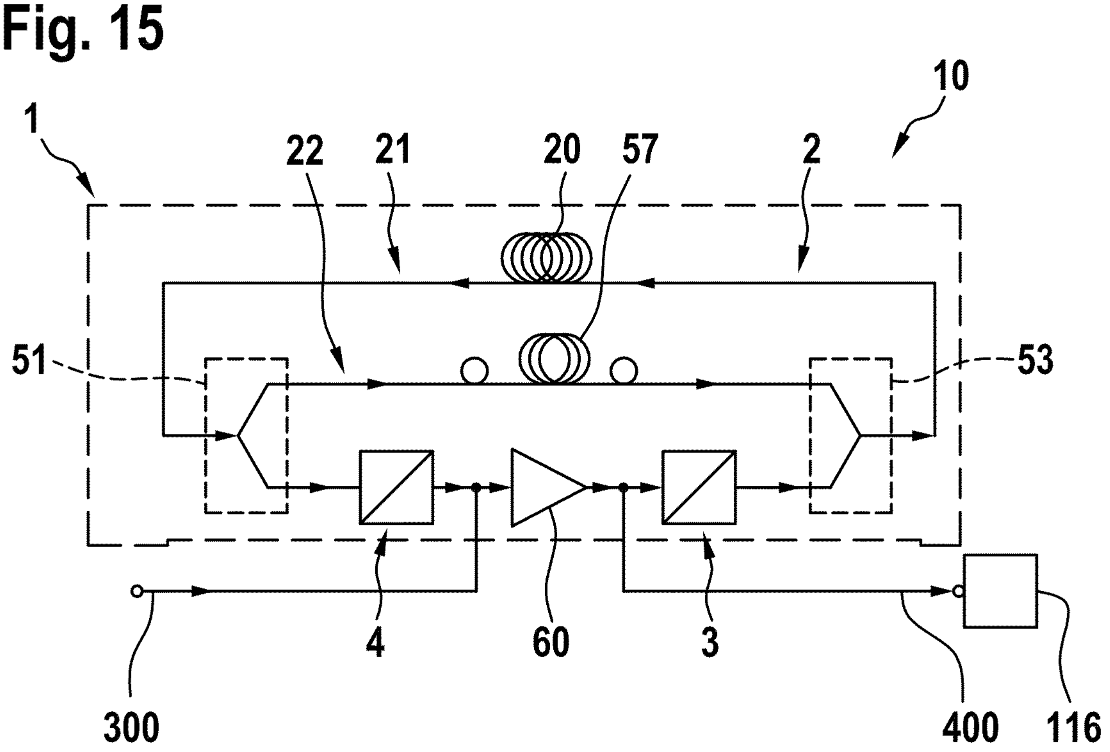

FIG. 15 refers to a watch 100 according to a tenth embodiment of the invention.

Instead of the optical delay line 56 in the watch 100 of FIG. 14, a second light wave guide 57 is used here. The optical signal delay of the second light wave guide 57 corresponds to the total electrical and optical signal delay through the opto-electrical converter 4, the electrical amplifier 60 and the electro-optical converter 3.

Figure 16:
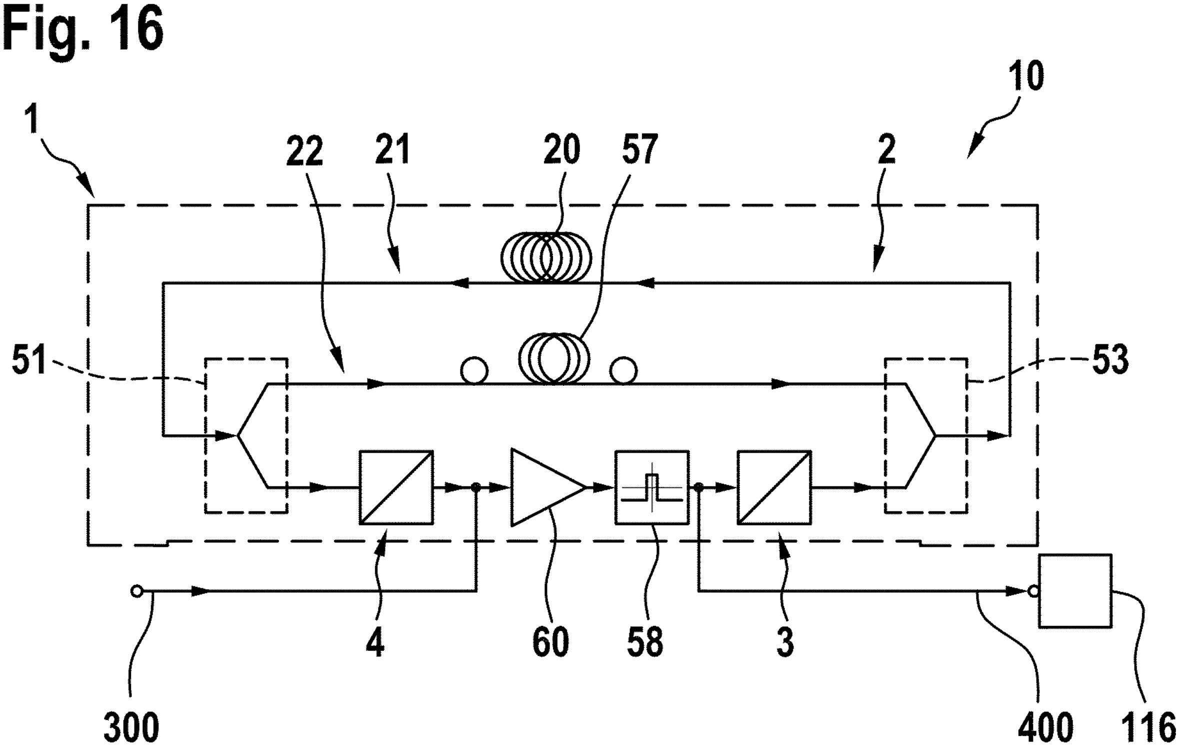

FIG. 16 refers to a watch 100 according to an eleventh embodiment of the invention.

In contrast to the oscillation system 1 shown in FIG. 15, a circuit 58 for data and clock recovery is used here between the output of the electrical amplifier 60 and the input of the electro-optical converter 3. Such circuits, which are also termed retimers, are used to regenerate the shape of the electrical and optical signal, which has been adapted by dispersion and attenuation.

In addition to the above written description of the invention, explicit reference is hereby made to the drawings of the invention in FIGS. 1 to 16 for the purpose of supplementing the disclosure thereof.

The invention claimed is:

1. A watch comprising:

a timer arrangement with an oscillation system, wherein the oscillation system comprises:

a light wave guide arrangement with a light wave guide, an electro-optical converter adapted to feed a clocked light signal into the light wave guide arrangement, and an opto-electrical converter receiving the light signal from the light wave guide and adapted to generate an electrical signal based on the received light signal, wherein the timer arrangement comprises an electronic usage signal generating device configured to generate a usage signal based on a frequency of the electrical signal, and a watch display device adapted to display the time based on the usage signal, wherein the oscillation system comprises an optical signal path in the light wave guide arrangement from the electro-optical converter to the opto-electrical converter and an electrical signal path from the opto-electrical converter to the electro-optical converter, wherein the electro-optical converter is controllable based on the electrical signal of the opto-electrical converter, and the electrical signal path is configured to invert the electrical signal.

2. The watch according to claim 1, comprising an electrical amplifier for amplifying the electrical signal between the opto-electrical converter and the electro-optical converter.

3. The watch according to claim 1, comprising a trigger and a monoflop, wherein the trigger is configured to drive the monoflop by means of the electrical signal from the opto-electrical converter and the monoflop is configured to generate an output pulse for controlling the electro-optical converter.

4. The watch according to claim 1, comprising a frequency filter for filtering the electrical signal, which is disposed between the opto-electrical converter and the electro-optical converter.

5. The watch according to claim 1, comprising a Schmitt trigger configured to convert the electrical signal into a square wave signal.

6. The watch according to claim 1, comprising a data unit comprising a modulator to modulate an input signal of the electro-optical converter based on a data set.

7. The watch according to claim 6, comprising:

a memory unit for storing a data set, and/or an input unit for inputting a data set, and/or a read-out unit for reading out the data set from a modulated output signal of the opto-electrical converter, and for outputting information based on the read-out data set.

8. The watch according to claim 1, comprising a crystal oscillator with a predetermined crystal oscillator oscillation frequency, wherein the usage signal generating device is adapted to compare the frequency of the electrical signal with the crystal oscillator oscillation frequency to generate an actual comparison value, and to generate the usage signal based on the frequency of the electrical signal and the actual comparison value.

9. The watch according to claim 8, wherein a plurality of temperature-dependent memory comparison values and associated correction values are stored in the usage signal generating device, and the usage signal generating device is adapted to associate the actual comparison value with a memory comparison value and to generate the usage signal based on the frequency of the electrical signal and the correction value.

10. The watch according to claim 1, wherein:

the timer arrangement further comprises an electromechanical device; and the watch further comprises a gear train, a drive device for driving the gear train, and a watch display device connected to the gear train and being movable by the gear train, wherein the electromechanical device is movable by means of the usage signal generated by the electronic usage signal generating device, whereby the electromechanical device directly or indirectly engages the gear train in a clocked manner.

11. The watch according to claim 1, further comprising:

a gear train, a drive device for driving the gear train, and a watch display device connected to the gear train and movable through the gear train, wherein the drive device is controllable by means of the usage signal.

* * * * *